(12) United States Patent
Earnshaw et al.

(10) Patent No.: US 8,964,819 B2
(45) Date of Patent: Feb. 24, 2015

(54) ASYMMETRIC MIXED-MODE POWERLINE COMMUNICATION TRANSCEIVER

(71) Applicant: QUALCOMM Incorporated, San Diego, CA (US)

(72) Inventors: William E. Earnshaw, Los Gatos, CA (US); Arun Avudainayagam, Gainesville, FL (US); Syed Adil Hussain, Ocala, FL (US); Anthony James Cowan, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 13/758,916

(22) Filed: Feb. 4, 2013

(65) Prior Publication Data

US 2013/0259101 A1 Oct. 3, 2013

Related U.S. Application Data

(60) Provisional application No. 61/619,044, filed on Apr. 2, 2012.

(51) Int. Cl.
*H04B 1/38* (2006.01)
*H04B 3/54* (2006.01)
(Continued)

(52) U.S. Cl.
CPC ................ *H04B 3/54* (2013.01); *H04B 7/0413* (2013.01); *H04B 3/544* (2013.01); *H04B 7/0452* (2013.01); *H04B 3/32* (2013.01); *H04B 7/0417* (2013.01); *H04B 2203/5445* (2013.01)
USPC ............................. 375/219; 375/299; 375/347

(58) Field of Classification Search
CPC ............... H04B 7/0413; H04B 7/0452; H04B 7/15557; H04B 3/23; H04B 7/0417
USPC .................. 375/219–222, 267, 299, 347, 349
See application file for complete search history.

(56) References Cited

U.S. PATENT DOCUMENTS 7,091,854 B1 * 8/2006 Miao ......................... 340/539.26
8,140,122 B2 * 3/2012 Park et al. ..................... 455/561
(Continued)

FOREIGN PATENT DOCUMENTS

| EP | 2509248 A2 | 10/2012 |
|---|---|---|
| WO | 2011001430 A2 | 1/2011 |
| WO | 2013151952 | 1/2011 |

OTHER PUBLICATIONS

"PCT Application No. PCT/US2013/034874 International Search Report", 12 pages.

(Continued)

*Primary Examiner* — Emmanuel Bayard
(74) *Attorney, Agent, or Firm* — DeLizio Gilliam, PLLC

(57) ABSTRACT

An asymmetric mixed-mode transceiver may determine to communicate with a destination powerline communication device. The asymmetric mixed-mode transceiver may determine whether an operational mode associated with the destination powerline communication device is a multiple-output multiple-input (MIMO) mode or a single-output single-input (SISO) mode. The asymmetric mixed-mode transceiver may dynamically change its operational mode to either the MIMO mode or the SISO mode to match the operational mode of the destination powerline communication device. The asymmetric mixed-mode transceiver may receive a communication from a source powerline communication device. The asymmetric mixed-mode transceiver may determine whether an operational mode associated with the source powerline communication device is the MIMO mode or the SISO mode. The asymmetric mixed-mode transceiver may dynamically change its operational mode to match the operational mode of the source powerline communication device.

32 Claims, 12 Drawing Sheets

(51) Int. Cl.
*H04B 3/32* (2006.01)
*H04B 7/04* (2006.01)

(56) References Cited

U.S. PATENT DOCUMENTS

| | | | | |
|---|---|---|---|---|
| 8,625,507 | B1 * | 1/2014 | Gurbuz et al. | 370/329 |
| 2008/0273613 | A1 | 11/2008 | Kol | |
| 2009/0033524 | A1 * | 2/2009 | Tiirola et al. | 341/51 |
| 2009/0137214 | A1 * | 5/2009 | Hofmann et al. | 455/82 |
| 2009/0213765 | A1 * | 8/2009 | Rinne et al. | 370/278 |
| 2010/0215088 | A1 * | 8/2010 | Park et al. | 375/224 |
| 2010/0284449 | A1 * | 11/2010 | de Veciana et al. | 375/219 |
| 2010/0296423 | A1 | 11/2010 | Heydari | |
| 2011/0194594 | A1 * | 8/2011 | Noh et al. | 375/224 |
| 2011/0195741 | A1 * | 8/2011 | Kim et al. | 455/522 |
| 2011/0317679 | A1 * | 12/2011 | Jain | 370/338 |
| 2012/0057483 | A1 | 3/2012 | Kim et al. | |
| 2012/0127889 | A1 | 5/2012 | Yomo et al. | |
| 2012/0134279 | A1 * | 5/2012 | Tamaki | 370/248 |
| 2012/0149411 | A1 * | 6/2012 | Miyoshi et al. | 455/501 |
| 2012/0161543 | A1 | 6/2012 | Reuven et al. | |
| 2012/0287870 | A1 * | 11/2012 | Lin et al. | 370/329 |
| 2013/0039236 | A1 * | 2/2013 | Malladi | 370/310 |
| 2013/0182589 | A1 * | 7/2013 | Tolentino et al. | 370/252 |
| 2013/0188753 | A1 * | 7/2013 | Tarlazzi et al. | 375/299 |

OTHER PUBLICATIONS

Co-pending U.S. Appl. No. 61/619,044, filed Apr. 2, 2012, 29 pages.

* cited by examiner

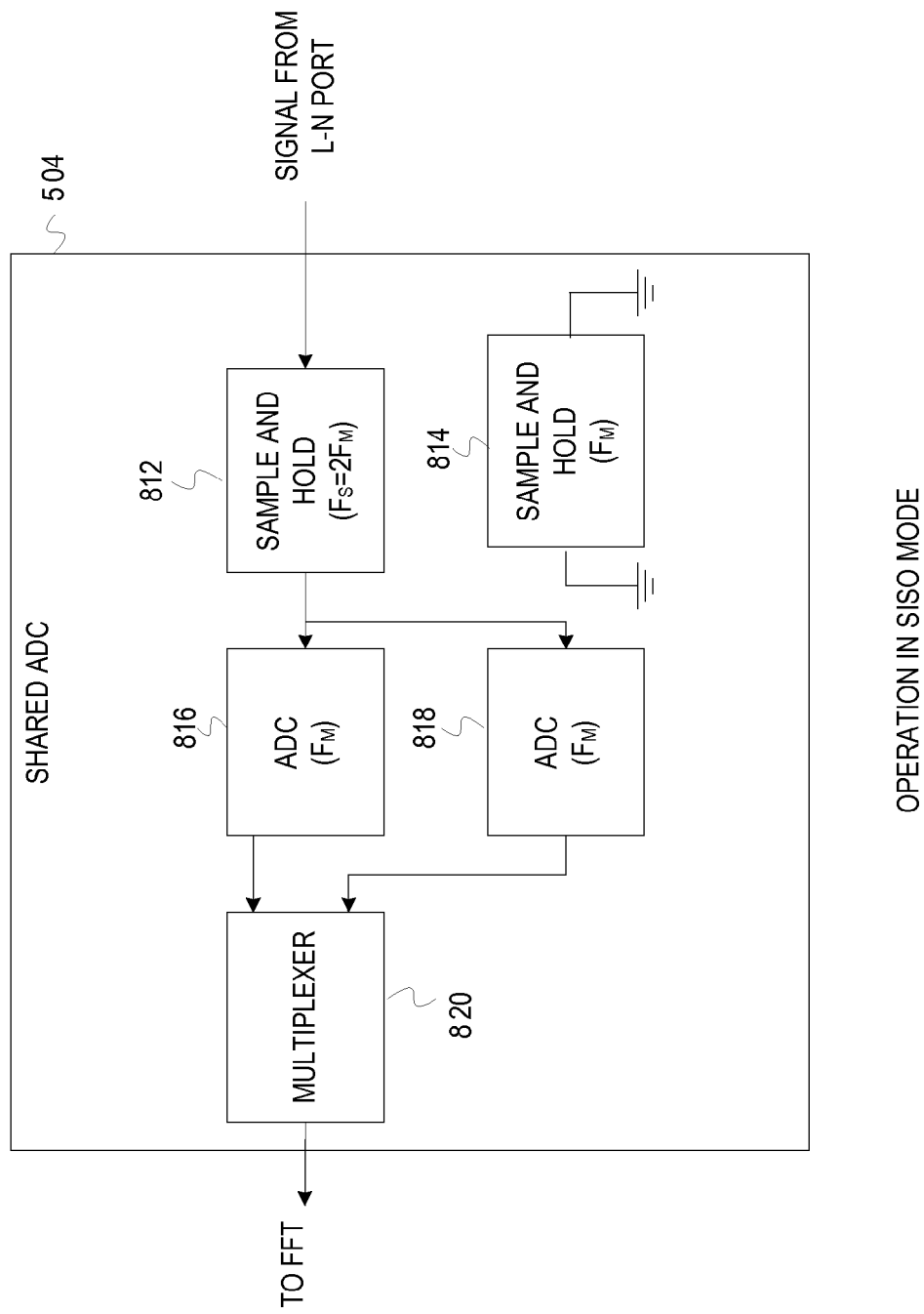

OPERATION IN SISO MODE

OPERATION IN MIMO MODE

ASYMMETRIC MIXED-MODE POWERLINE COMMUNICATION TRANSCEIVER

RELATED APPLICATIONS

This application claims the priority benefit of U.S. Provisional Application No. 61/619,044 filed Apr. 2, 2012.

BACKGROUND

Embodiments of the inventive subject matter generally relate to the field of communication systems, and, more particularly, to an asymmetric mixed-mode transceiver for powerline communication.

Powerline communication is a technique of transmitting and receiving communication signals over an electrical wire. Traditional powerline communication systems use a pair of wires (Line (L) and Neutral (N)) to transmit and receive data. A wire-pair over which a signal is differentially transmitted or received can be referred to as a TX (transmit) port or RX (receive) port respectively. A single-input single-output (SISO) system utilizes a single port for communication (e.g., the L-N port). However, some electrical systems include a third wire, the ground (G) or protective-earth wire, which allows three ports (L-N, L-G and N-G) to be utilized for communication. A communication system where signals are simultaneously transmitted and received over multiple ports is referred to as multiple-input multiple-output (MIMO) system. In accordance with Kirchoff's law, the voltage on the third port is a linear combination of the voltage on other two ports. Therefore, the third port cannot be used as a TX port, but it can be used as a RX port due to mismatches in components, parasitic capacitances and receive amplifiers used on the third receive chain. Such mismatches may make the signal received on the third port relatively uncorrelated with the signals received on the other two ports. Apart from the signals received on the three wire pairs, a common mode signal (e.g., a signal that leaks to ground) can also provide an independent received signal at the receiver. Hence, a powerline MIMO communication system can have 2 TX ports (e.g., L-N and L-G) and 4 RX ports (L-N, L-G, N-G and common mode).

Powerline communication systems typically utilize Orthogonal Frequency Division Multiplexing (OFDM). A MIMO system operating over the same bandwidth incurs significant penalty in terms of CMOS (Complementary Metal Oxide Semiconductor) area (number of gates) when compared to a SISO system. For instance, the TX ports in a 2×2 MIMO system with transmission signals sampled at a sampling frequency of $F_M$, utilize double the number of mappers, filters, amplifiers, etc. as compared to a SISO system with transmission signals sampled at a sampling frequency of Fs. A 2×2 MIMO transmitter with a smaller operating bandwidth can outperform a SISO transmitter having a relatively larger bandwidth by the processing gain achieved in the 2×2 MIMO system using two transmission streams simultaneously. However, MIMO powerline systems are not applicable to certain markets; for example, due to lack of availability of the ground wire in some geographies, regulations that prevent transmission on any wire pair that involves the ground wire, etc.

SUMMARY

Various embodiments are disclosed for an asymmetric mixed-mode transceiver. In one embodiment, the asymmetric mixed-mode transceiver determines to communicate with a destination powerline communication device. It is determined whether an operational mode associated with the destination powerline communication device is a multiple-output multiple-input (MIMO) mode or a single-output single-input (SISO) mode. It is also determined whether the operational mode of the destination powerline communication device matches an operational mode of the asymmetric mixed-mode transceiver. The operational mode of the asymmetric mixed-mode transceiver is dynamically changed to either the MIMO mode or the SISO mode to match the operational mode of the destination powerline communication device in response to determining the operational mode of the destination powerline communication device does not match the operational mode of the asymmetric mixed-mode transceiver.

In some embodiments, the asymmetric mixed-mode transceiver receives a communication from a source powerline communication device. It is determined whether an operational mode associated with the source powerline communication device is the MIMO mode or the SISO mode. It is also determined whether the operational mode of the source powerline communication device matches an operational mode of the asymmetric mixed-mode transceiver. The operational mode of the asymmetric mixed-mode transceiver is dynamically changed to either MIMO mode or SISO mode to match the operational mode of the source powerline communication device in response to determining the operational mode of the source powerline communication device does not match the operational mode of the asymmetric mixed-mode transceiver.

BRIEF DESCRIPTION OF THE DRAWINGS

The present embodiments may be better understood, and numerous objects, features, and advantages made apparent to those skilled in the art by referencing the accompanying drawings.

FIG. 8A depicts one implementation of a shared ADC for a receiver of an asymmetric mixed-mode transceiver for operations in SISO mode.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In some embodiments, an asymmetric mixed-mode powerline transceiver (hereinafter "asymmetric mixed-mode transceiver") is statically or dynamically configurable to operate in MIMO or SISO operational modes. The asymmetric mixed-mode transceiver can include two transmit-receive chains to support operations in MIMO mode. The asymmetric mixed-mode transceiver can support operation in SISO mode at one of the two transmit-receive chains. The two transmit-receive chains may be designed for different operating bandwidths and sampling frequencies. The first transmit-receive chain may be designed for an operating bandwidth $W_S$ with a sampling frequency $F_S$. The second transmit-receive chain may be designed for an operating bandwidth $W_M$ with a sampling frequency $F_M$. In MIMO mode, both transmit-receive chains may be clocked at frequency $F_M$, and the asymmetric mixed-mode transceiver can operate over a bandwidth of $W_M$. In SISO mode, the first transmit-receive chain may be clocked at a frequency of $F_S$ and the second transmit-receive chain may be deactivated. The asymmetric mixed-mode transceiver can switch from MIMO mode to SISO mode and vice-versa automatically (i.e., dynamic implementation) or by manual configuration (i.e., static implementation), as will be further described below.

Figure 1:
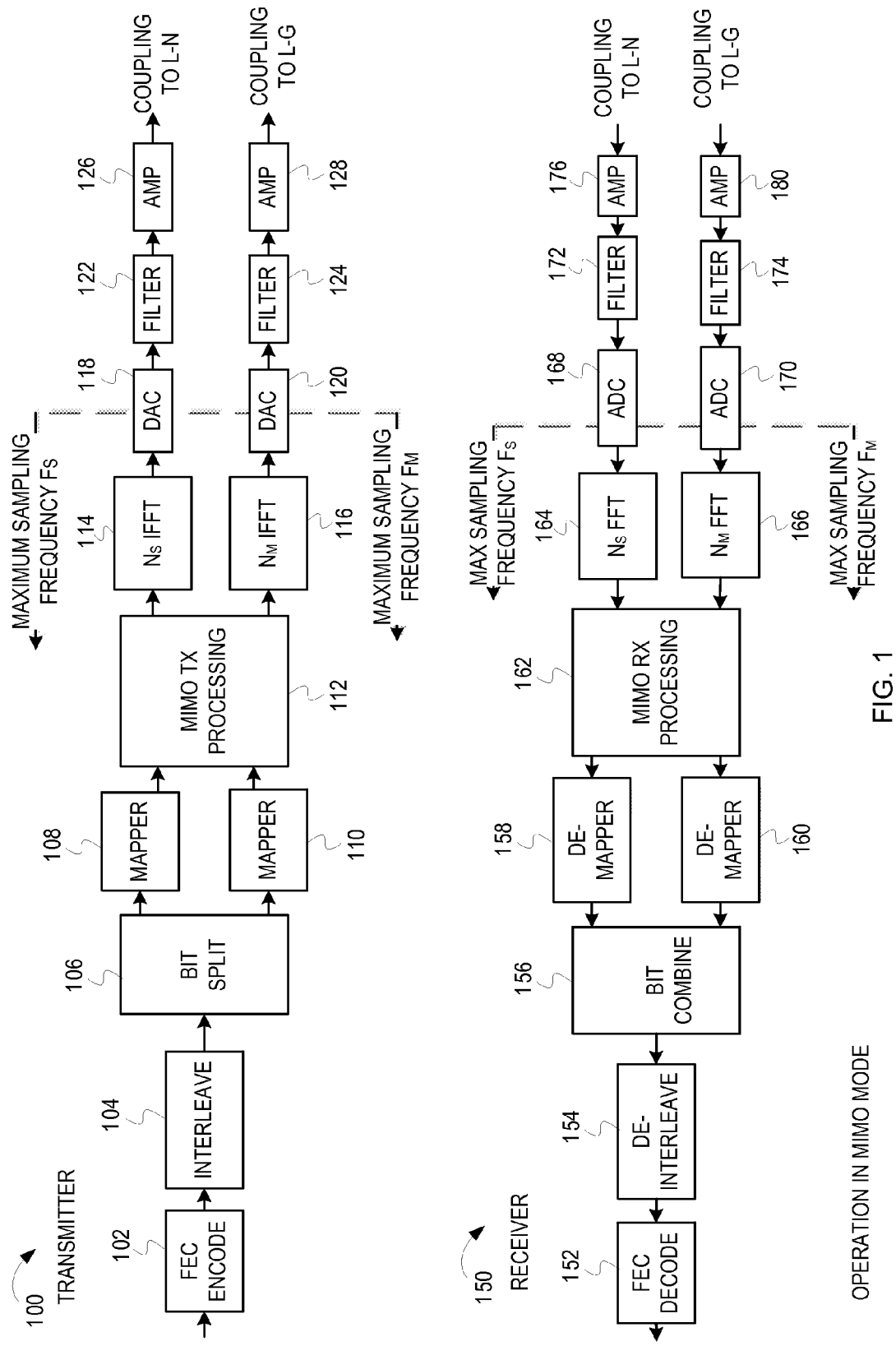
FIG. 1 depicts an example block diagram of an asymmetric mixed-mode transceiver operating in MIMO mode.

FIG. 1 depicts an example block diagram of an asymmetric mixed-mode transceiver operating in MIMO mode. In one implementation, the asymmetric mixed-mode transceiver includes a transmitter 100 and a receiver 150. The transmitter 100 may include a Forward Error Correction (FEC) encode unit 102, an interleave unit 104, a bit split unit 106, a mapper 108, a mapper 110, a MIMO TX processing unit 112, an $N_S$ IFFT unit 114, an $N_M$ IFFT unit 116, a digital-to-analog converter (DAC) 118, a DAC 120, a filter 122, a filter 124, an amplifier 126, and an amplifier 128. The receiver 150 may include an FEC decode unit 152, a de-interleave unit 154, a bit combine unit 156, a de-mapper 160, a MIMO RX processing unit 162, an $N_S$ FFT unit 164, an $N_M$ FFT unit 166, an ADC 168, an ADC 170, a filter 172, a filter 174, an amplifier 176 and an amplifier 180. The transmitter 100 may include two transmit chains. The first transmit chain may include the mapper 108, the $N_S$ IFFT unit 114, the DAC 118, the filter 122 and the amplifier 126. The second transmit chain may include the mapper 110, the $N_M$ IFFT unit 116, the DAC 120, the filter 124 and the amplifier 128. In one implementation, the FEC encode unit 102, the interleave unit 104, the bit split unit 106 and the MIMO TX processing unit 112 are common to both transmit chains.

In some implementations, the FEC encode unit 102 encodes data to be transmitted on a powerline communication medium. For example, the FEC encode unit may add redundant bits to the data. The redundant bits allow a receiver to detect one or more errors that may occur in the message. The redundant bits may also allow a receiver to correct one or more errors without retransmission. The FEC encode unit 102 may utilize block codes or convolutional codes to encode the data. The interleave unit 104 can rearrange the bits in the encoded data (received from the FEC encode unit 102) to improve the performance of forward error correction coding.

The interleave unit 104 can send a bit stream to the bit split unit 106. The bit split unit 106 can split the bit stream into two bit streams to be transmitted via two channels (L-N and L-G) to a destination powerline communication device of the network. The mapper 108 and mapper 110 can convert an input bit stream, $b_1, \ldots, b_K$ into a symbol stream $S_1, \ldots, S_L$ (L≤K). In one implementation, the mappers 108 and 110 utilize one of Binary Phase Shift Keying (BPSK), Phase Shift Keying (PSK), and Quadrature Amplitude Modulation (QAM), to generate the symbol stream. It is noted however that in other implementations, the mappers 108 and 110 may utilize other modulation techniques. The mappers 108 and 110 may send the two symbol streams to the MIMO TX processing unit 112. The MIMO TX processing unit 112 can implement one or more MIMO functionalities (e.g., spatial multiplexing, beamforming, space-time coding, etc.) on the symbol streams. The MIMO TX processing unit 112 can send the symbol streams to the $N_S$ IFFT unit 114 and the $N_M$ IFFT unit 116. The $N_S$ IFFT unit 114 and the $N_M$ IFFT unit 116 can convert frequency-domain signals into the time-domain signals using the Inverse Fast Fourier Transform. The $N_S$ IFFT unit 114 may include capabilities to compute an $N_S$ point IFFT for the frequency domain signal. However, when the asymmetric mixed-mode transceiver operates in MIMO mode, the $N_S$ IFFT unit 114 computes an $N_M$ point IFFT for the frequency-domain signal as the operating bandwidth is limited to $W_M$ (as will be further described below). The $N_M$ IFFT unit 116 can compute an $N_M$ point IFFT for the frequency-domain signal. The $N_S$ IFFT unit 114 and the $N_M$ IFFT unit 116 can send the time-domain signals to the DAC 118 and the DAC 120, respectively. The DAC 118 and the DAC 120 can convert digital signals (received from the $N_S$ IFFT unit 114 and the $N_M$ IFFT unit 116) to analog signals. The DAC 118 may include capabilities to operate at a sampling frequency of $F_S$, where $F_S$ is the sampling frequency for an operating bandwidth of $W_S$ in SISO mode. However, when the asymmetric mixed-mode transceiver operates in MIMO mode, the DAC 118 operates at a frequency of $F_M$, where $F_M$ is the sampling frequency for an operating bandwidth of $W_M$ in MIMO mode. As will be further described below, the operating bandwidth in SISO mode ($W_S$) and the sampling frequency $F_S$ is greater than the operating bandwidth in MIMO mode ($W_M$) and the sampling frequency $F_M$. The DAC 120 can operate at a sampling frequency of $F_M$. The DAC 118 and the DAC 120 send the analog signals to the filter 122 and the filter 124, respectively. The filters 122 and 124 can remove extraneous frequency components from the analog signals. The amplifiers 126 and 128 can receive the filtered signals from the filters 122 and 124, respectively. The amplifiers 126 and 128 can amplify the filtered signals for transmission. The amplified signal from the amplifier 126 may be coupled to an L-N transmission port, and the amplified signal from the amplifier 128 may be coupled to an L-G transmission port.

In some implementations, the receiver unit 150 includes two receive chains to receive communications from a source powerline communication device of the network. The first receive chain can include the amplifier 176, the filter 172, the ADC 168, the $N_S$ FFT unit 164 and the de-mapper 158. The second receive chain may include the amplifier 180, the filter 174, the ADC 170, the $N_M$ FFT unit 166 and the de-mapper 160. The FEC decode unit 152, the de-interleave unit 154, the bit combine unit 156 and the MIMO RX processing unit 162 may be common to both receive chains. In the receiver unit 150, the amplifier 176 can amplify a signal received at an L-N receiver port. Similarly, the amplifier 180 can amplify a signal received an L-G receiver port. The amplifiers 176 and 180 can send the amplified signals to the filters 172 and 174, respectively. The filters 172 and 174 may filter the amplified signals to remove extraneous frequency components (e.g., frequency components outside the powerline communication frequency band). The filters 172 and 174 can send the filtered signals to the ADC 168 and the ADC 170, respectively. The ADC 168 and the ADC 170 can convert analog signals (received from the filters 172 and 174) to digital signals. The ADC 168 may include capabilities to operate at the sampling frequency of $F_S$. However, when the asymmetric mixed-mode transceiver operates in MIMO mode, the ADC 168 operates at the frequency of $F_M$. The ADC 170 can operate at the sampling frequency of $F_M$. The ADC 168 and the ADC 170 may send the digital signals to the $N_S$ FFT unit 164 and the $N_M$ FFT unit 166, respectively. The $N_S$ FFT unit 164 and the $N_M$ FFT unit 166 may convert time-domain signals (received from the ADCs 168 and 170) to frequency-domain signals using the Fast Fourier Transform. The $N_S$ FFT unit 164 may include capabilities to compute an $N_S$ point FFT for the time-domain signal. However, when the asymmetric mixed-mode transceiver operates in MIMO mode, the $N_S$ FFT unit 164 computes an $N_M$ point FFT for the time-domain signal received from the ADC 168 as the bandwidth is limited to $W_M$. The $N_M$ FFT unit 166 can compute an $N_M$ point FFT for the time-domain signal received from the ADC 170. The $N_S$ FFT unit 164 and the $N_M$ FFT unit 166 can send the frequency domain signals to the MIMO RX processing unit 162. The MIMO RX processing unit 162 may perform one or more operations (e.g., weighted amplification of different signals, etc.) on the signals received from the $N_S$ FFT unit 164 and the $N_M$ FFT unit 166. The MIMO RX processing unit 162 sends the processed signals to the de-mapper 158 and the de-mapper 160. The de-mapper 158 and the de-mapper 160 can decode received symbol streams into bit streams. The de-mapper 158 and the de-mapper 160 can send the bit streams to the bit combine unit 156. The bit combine unit 156 can combine the two bit streams received from the de-mapper 158 and the de-mapper 160 into a single bit stream. The bit combine unit 156 sends the single bit stream to the de-interleave unit 154. The de-interleave unit 154 can rearrange the bit stream received from the bit combine unit 156. The de-interleave unit 154 can send the rearranged bit stream to the FEC decode unit 152. The FEC decode unit 152 may detect one or more errors in the bit stream received from the de-interleave unit 154. In some implementations, the FEC decode unit 152 can also correct one or more errors in a received bit stream.

In some implementations, the two transmit chains and the two receive chains are clocked at the frequency $F_M$ in MIMO mode, and the asymmetric mixed-mode transceiver operates over the bandwidth $W_M$. The circuit components in the first chain that are designed for carriers with a frequency greater than $F_M/2$ may be deactivated. In some implementations, the circuit components in the first chain that are designed for carriers with a frequency greater than $F_M/2$ may be bypassed. The asymmetric mixed-mode transceiver can switch from MIMO mode to SISO mode and vice-versa (as described below with reference to FIG. 2).

Figure 2:
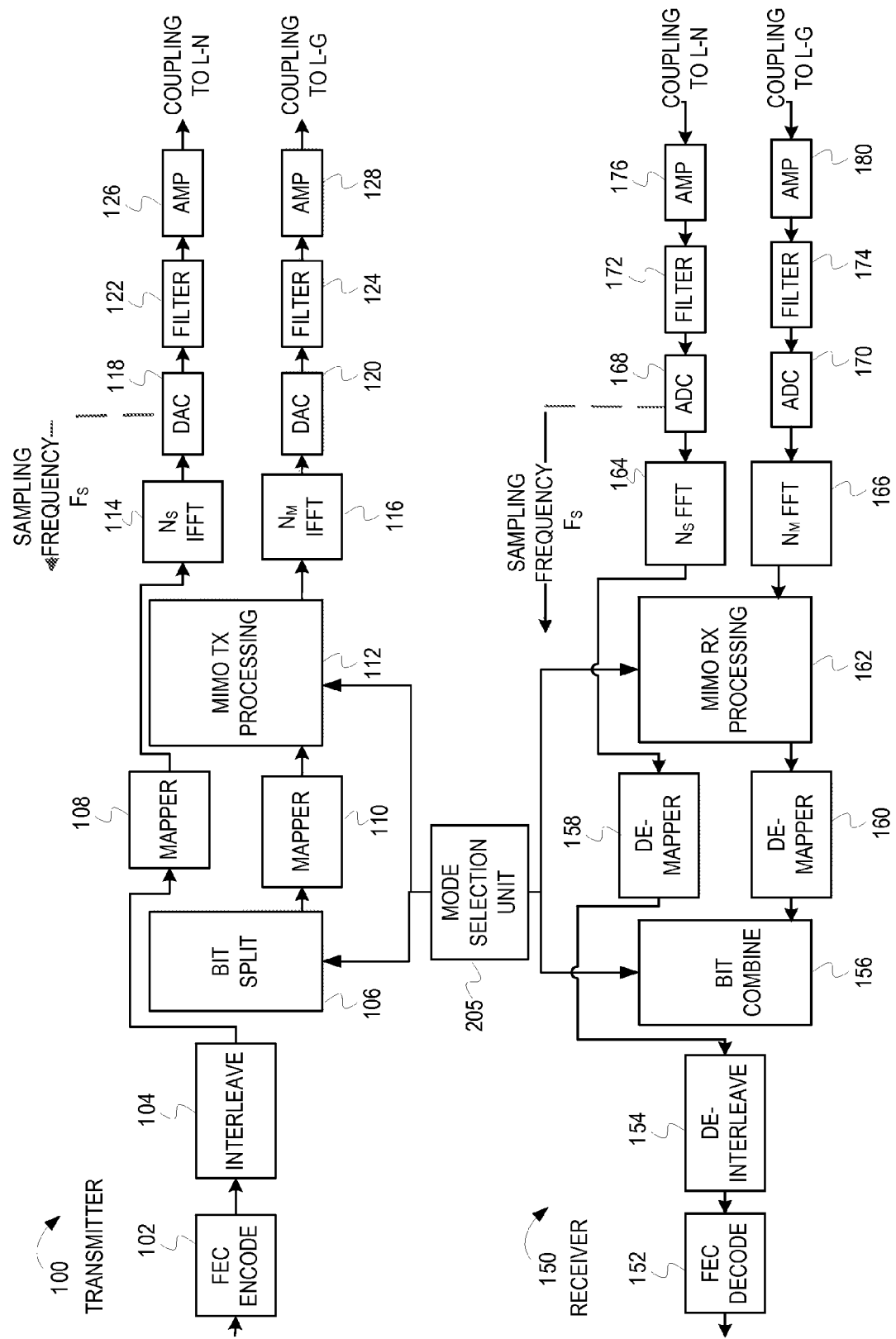
FIG. 2 depicts an example block diagram of an asymmetric mixed-mode transceiver operating in SISO mode.

FIG. 2 depicts an example block diagram of an asymmetric mixed-mode transceiver operating in SISO mode. FIG. 2 includes the transmitter 100 and the receiver 150 of the asymmetric mixed-mode transceiver, as described above with reference to FIG. 1. The components in the transmitter 100 and the receiver 150 can perform similar functions as described above in FIG. 1. FIG. 2 also includes a mode selection unit 205 which may be shared between the transmitter 100 and the receiver 150. The mode selection 205 unit may be coupled to one or more units of the transmitter 100 and the receiver 150. For example, the mode selection unit 205 may be coupled to the bit split unit 106, the MIMO TX processing unit 112, the bit combine unit 156 and the MIMO RX processing unit 162. The mode selection unit 205 may provide one or more control signals or instructions to the bit split unit 106, the MIMO TX processing unit 112, the bit combine unit 156, and the MIMO RX processing unit 162 to switch from MIMO mode to SISO mode and vice-versa.

In some implementations, the asymmetric mixed-mode transceiver transmits and receives powerline communication signals using the L-N port while operating in SISO mode (i.e., the L-G port may not be utilized). For example, in SISO mode, only the first chain of the transmitter 100 and the first chain of the receiver 150 may be in operation. The bit-split unit 106, the MIMO TX processing unit 112, and the second transmit chain may be bypassed when operating in SISO mode. For example, as shown in FIG. 2, the mode selection unit 205 can send one or more control signals to a switch to bypass the bit-split unit 106 and the MIMO TX processing unit 112 in the second transmit chain. In some implementations the mode selection unit 205 may send one or more control signals to a multiplexer or other circuit components to bypass the bit-split unit 106 and the MIMO TX processing unit 112 in the second transmit chain. Similarly, for SISO mode, the bit combine unit 156, the MIMO RX processing unit 162, and the second receive chain in the receiver 150 may be bypassed. For example, as shown in FIG. 2, the mode selection unit 205 can send one or more control signals to a switch to bypass the bit combine unit 156 and the MIMO RX processing unit 162 in the second receive chain. In some implementations the mode selection unit 205 may send one or more control signals to a multiplexer or other circuit components to bypass the bit combine unit 156 and the MIMO RX processing unit 162 in the second receive chain. In other implementations, instead of bypassing the components, the bit-split unit 106, the MIMO TX processing unit 112, the second transmit chain, the bit combine unit 156, the MIMO RX processing unit 162, and the second receive chain may be deactivated (e.g., by turning off supply of power to these units) when operating in SISO mode. In SISO mode, the first transmit chain may be clocked at a frequency of $F_S$, and the asymmetric mixed-mode transceiver can operate over a bandwidth of $W_S$.

The asymmetric mixed-mode transceiver can behave as a SISO device or as a MIMO device, and can be pre-configured in a static implementation or can be configured dynamically in a dynamic implementation. For example, the asymmetric mixed-mode transceiver can be statically configured by an end-user or a service provider deploying the powerline communication devices. The asymmetric mixed-mode transceiver may be dynamically configured in the dynamic implementation by the mode selection unit 205. For example, in the dynamic implementation the mode selection unit 205 may instruct one or more components in the transmitter 100 and the receiver 150 to switch from SISO mode to MIMO mode and vice-versa, as will be further described below.

In the static implementation, the asymmetric mixed-mode transceiver can be pre-configured as a SISO device or a MIMO device. The asymmetric mixed-mode transceiver, when statically configured in MIMO mode can communicate with other MIMO devices at full-rate, but may suffer performance degradation when communicating with other higher-bandwidth SISO devices. Similarly the asymmetric mixed-mode transceiver, when statically configured as a higher-bandwidth SISO device can communicate with other high-bandwidth SISO devices at full-rate, but may suffer a performance loss when communicating with other lower-bandwidth MIMO devices. In powerline communication networks that support only SISO devices or only MIMO devices, the appropriate configuration of the asymmetric mixed-mode transceiver in the static implementation can ensure performance with no throughput losses. The static implementation of the asymmetric mixed-mode transceiver can be used in networks that support only SISO devices or only MIMO devices. The static implementation of the asymmetric mixed-mode transceiver may be manually pre-configured (e.g., using program instructions, firmware, and/or hardware switches). For example, the asymmetric mixed-mode transceiver can be configured by a user to bypass the bit-split unit 106, the MIMO TX processing unit 112, the second transmit chain, the bit combine unit 156, the MIMO RX processing unit 162 and the second receive chain for operation in SISO mode. In some implementations, the asymmetric mixed-mode transceiver may include a switch to turn off one or more components (e.g., the bit-split unit 106, the MIMO TX processing unit 112, the second transmit chain, the bit combine unit 156, the MIMO RX processing unit 162 and the second receive chain) to change the operation of the asymmetric mixed-mixed-mode transceiver to SISO mode. In other implementations, the asymmetric mixed-mode transceiver may be pre-configured to operate in the static implementation during manufacture. For example, the asymmetric mixed-mode transceiver may be configured to operate in SISO mode or MIMO mode based on pre-configured factory settings of the asymmetric mixed-mode transceiver.

In the dynamic implementation, the asymmetric mixed-mode transceiver can allow operation of the asymmetric mixed-mode transceiver in mixed powerline communication networks (i.e. networks that include higher-bandwidth SISO devices and lower-bandwidth MIMO devices). The dynamic implementation may allow the asymmetric mixed-mode transceiver to receive communications from either a SISO device(s) or a MIMO device(s) at any one time, as compared to the static implementation which may incur a performance loss. In some implementations, the asymmetric mixed-mode transceiver may be dynamically configured to choose its mode of operation on-the-fly. For example, the two transmit/receive chains in the asymmetric mixed-mode transceiver may be always on, and based on the data input of the second transmit/receive chain, the mode selection unit 205 may instruct the MIMO RX processing unit 162 to either utilize or bypass the second transmit/receive chain for operating in either of the MIMO or SISO mode, respectively, as will be further described below.

In a mixed powerline communication network (i.e., a powerline communication network having SISO and MIMO devices), the asymmetric mixed-mode transceiver can receive communications either from a lower-bandwidth MIMO device or from a higher-bandwidth SISO device. The transmissions in both SISO and MIMO modes on a powerline may have similar packet structures. Typically a packet includes three different portions: (1) Preamble—Used for packet detection and synchronization; (3) Frame-Control—Includes carrier information about the payload that follows in the packet (e.g., source-id, length, MIMO or SISO payload); and (3) Payload—Includes data being sent from a transmitter to a receiver. A powerline communication medium is a shared medium amongst powerline communication devices and the powerline communication devices contend for access. During contention, all the powerline communication devices in the network typically identify frame-control information in transmitted packets. The powerline communication devices may extract the packet length from the frame-control, and set a back-off counter to avoid contending for the shared medium during the corresponding payload duration. For MIMO and SISO devices to co-exist and inter-operate, the devices can listen to each other's frame-control. The frame-control for MIMO and SISO modes may be designed to be identical in widely adopted powerline standards (e.g., HomePlug AV, HomePlug AV2, etc.). The asymmetric mixed-mode transceiver may process the frame-control in the same manner for packets transmitted from both MIMO and SISO devices. Hence for all transmissions, the asymmetric mixed-mode transceiver detects a packet and decodes the frame-control of the packet in a similar manner irrespective of whether the transmission is from a MIMO or SISO device.

The receiver 150 in the asymmetric mixed-mode transceiver may not be able to pre-configure itself as a SISO/MIMO device before receiving a network packet. For example, the receiver 150 may not know which device in the network is sending the network packet, the operational mode and other characteristics associated with the transmitting device, etc. In one implementation, the receiver 150 uses a signal that it receives on the L-N port to decode the frame-control, which can indicate to the receiver 150 whether the network packet was sent from a SISO device or a MIMO device. For example, the mode selection unit 205 may receive the frame-control information from one or more components of the receiver 150 and determine whether the operational mode of the transmitting device is MIMO mode or SISO mode. The mode selection unit 205 may then instruct the MIMO RX processing unit 162 to process or not to process any signals received on the second transmit chain. For example, when the mode selection unit 205 determines that the operational mode of the transmitting device is SISO mode, the mode selection unit may instruct the MIMO RX processing unit 162 to ignore any signals received from the second receive chain to switch to SISO mode. In other examples, the mode selection unit 205 may configure one or more components in the receiver 150 to bypass the second receive chain. The mode selection unit 205 may send control signals to a switch, a multiplexer, etc. to bypass the bit combine unit 156, the MIMO RX processing unit 162, etc. in the second receive chain. In some implementations, the mode selection unit 205 may turn-off one or more components (e.g., the $N_M$ FFT unit 166, the de-mapper 160, the bit-combine unit 156, etc.) to switch to SISO mode. Similarly, when the mode selection unit 205 determines that the operational mode of the transmitting device is MIMO mode, the mode selection unit may instruct the MIMO RX processing 162 to utilize the signal received on the second receive chain to switch to MIMO mode. In some implementations, the mode selection unit 205 may improve the performance of the receiver 150 communicating with larger-bandwidth SISO devices by instructing the MIMO RX processing unit 162 to utilize diversity techniques (e.g., polarization, spread spectrum, etc.). The mode selection unit 205 may also instruct the MIMO RX processing unit 162 to perform MRC (maximal-ratio combining) or EGC (equal-gain combining) on the inputs from the $N_S$ FFT unit 164 and the $N_M$ FFT unit 166. In one implementation, MRC or EGC may not be done for the entire SISO bandwidth but for those carriers that lie in the intersection of the MIMO and SISO bandwidths. When the transmission mode is MIMO, the bit combine unit 156 can revert back to MIMO mode of operation. The dynamic implementation of the receiver 150 allows maintaining the performance of the asymmetric mixed-mode transceiver when communicating with a larger-bandwidth SISO device or a smaller-bandwidth MIMO device.

For the dynamic implementation, the transmitter 100 can automatically switch from SISO mode operation to MIMO mode operation and vice-versa. In the dynamic implementation, the transmitter 100 determines the operational mode of a destination device and automatically operates in SISO mode or MIMO mode to match the operation of the destination device. In one implementation, the transmitter 100 determines the operational mode of the destination device using powerline communication protocols, information of devices in the powerline network, etc. For example, the mode selection unit 205 may receive information about the operational mode of the destination device from one or more components which exchanges messages with the destination device when a communication link is established with the destination device. In some implementations, the information about the operational mode of the destination device may also be stored in a table that associates a network address of the destination device with its mode of operation. The mode selection unit 205 can appropriately configure the transmission mode based on the operational mode of a destination device by identifying the operation mode of the destination device from the table. In one embodiment, when the destination device operates in SISO mode, the mode selection unit 205 instructs the bit-split unit 106 to bypass the second transmit chain to switch to SISO mode. In another embodiment, the mode selection unit 205 may instruct the MIMO TX processing unit 112 to output zeros on the second transmit chain and act as a pass through between the mapper 108 and the $N_S$ IFFT unit 114 to switch to SISO mode. This configuration helps the transmitter 100 to maintain performance when communicating with higher-bandwidth SISO devices. The mode selection unit 205 may also instruct the MIMO TX processing unit 112 to implement one or more transmit diversity schemes to maintain performance when communicating with higher-bandwidth SISO devices. For example, the mode selection unit may instruct the MIMO TX processing unit 112 to send the output of the mapper 108 to the $N_S$ IFFT unit 114 and the $N_M$ IFFT unit 116. When the operational mode of the destination device is MIMO mode, the mode selection unit 205 may instruct the MIMO TX processing unit 112 to implement beamforming and switch to MIMO mode.

It is noted that in some embodiments of the dynamic implementation, the two transmit/receive chains in MIMO operation may not operate at the same sampling frequency, $F_M$, unlike in the static implementation. For example, the first transmit/receive chain may operate at the same sampling frequency, $F_S$, while simultaneously the second transmit/receive may operate at the sampling frequency, $F_M$. In both the static and dynamic implementations, the IFFT operations in a transmitter and the FFT operations in a receiver of an asymmetric mixed-mode transceiver may be performed by a shared FFT/IFFT engine. In one implementation, the transmitter and the receiver may utilize two FFT/IFFT engines, a first FFT/IFFT engine for the first transmit chain and the first receive chain, and a second FFT/IFFT engine for the second transmit chain and the second receive chain.

In the static implementation, when $F_S=2F_M$, the second transmit and receive chain can share an FFT/IFFT engine with the first transmit and receive chain to perform the FFT and IFFT operations (as described further below in FIG. 6). When $F_S=2F_M$, an asymmetric mixed-mode transceiver may be implemented using a single FFT/IFFT engine for the static implementation. The FFT/IFFT engine of size $N_S=2N_M$ can be configured such that the FFT/IFFT engine operates as two $N_M$-point FFT/IFFT engines for use in 2 MIMO chains. The two $N_M$-point FFT/IFFT engines can be combined to operate as a single $2N_M$-point FFT/IFFT engine for use in the SISO chain using Radix 2 FFT. Also, for static implementation when $F_S=2F_M$, a single interleaved ADC block can be shared between the first receive chain and the second receive chain (as described further below in FIGS. 8A, 8B and 8C). Similarly, the shared FFT/IFFT engine and/or the shared ADC block may be used for the dynamic implementation. The shared FFT/IFFT engine and the shared ADC block can reduce hardware, save power, and reduce overall cost.

Figure 3:
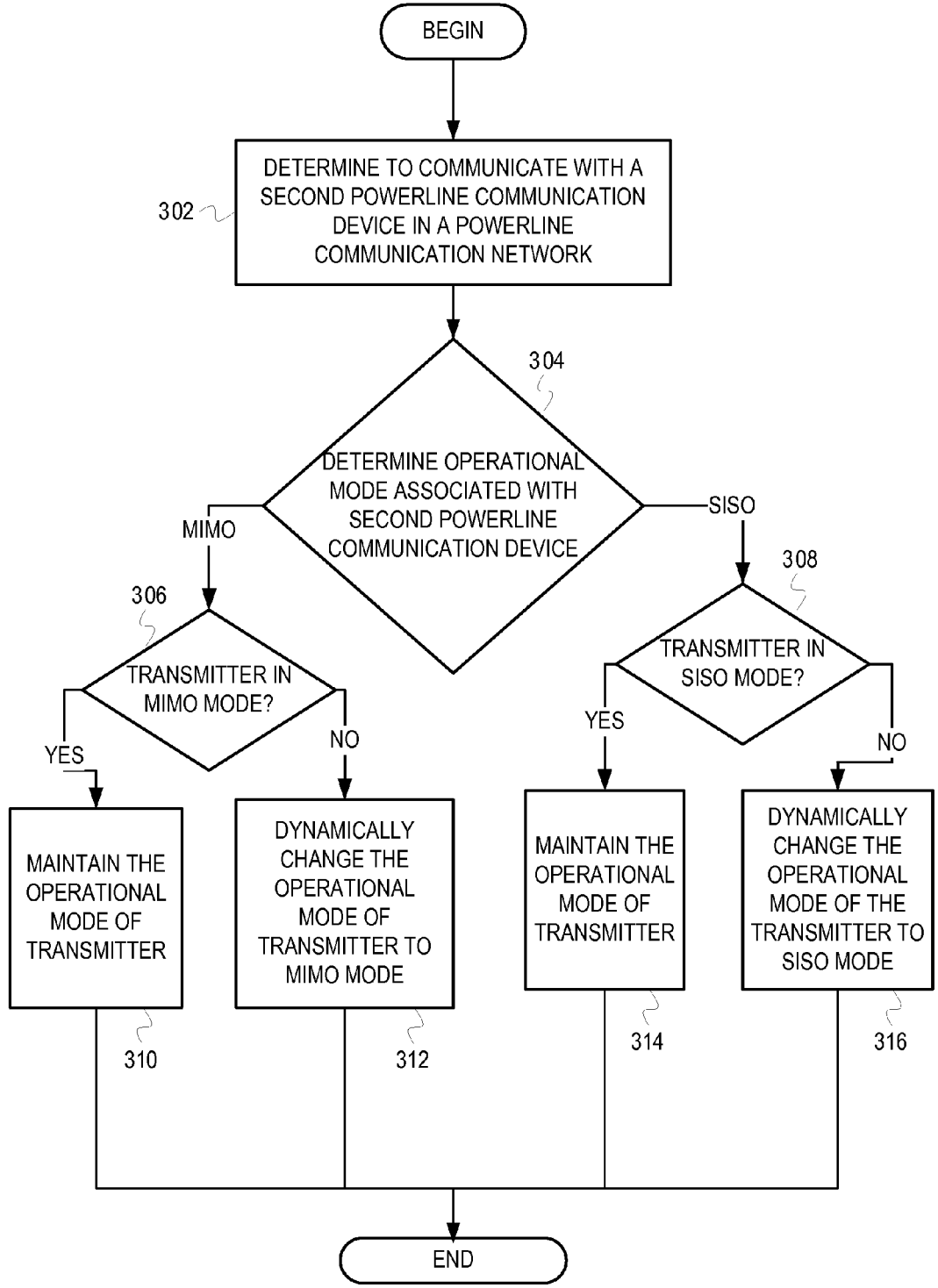
FIG. 3 illustrates a flow diagram of example operations of a transmitter of an asymmetric mixed-mode transceiver of a powerline communication device in a powerline communication network.

FIG. 3 illustrates a flow diagram of example operations of a transmitter of an asymmetric mixed-mode transceiver of a first powerline communication device (which may also be referred to as a source powerline communication device) in a powerline communication network.

At block 302, the transmitter 100 (e.g., as shown in FIGS. 1 and 2) of the first powerline communication device determines to communicate with a second powerline communication device (which may also be referred to as a destination powerline communication device) in the powerline communication network. In one implementation, the transmitter 100 determines that data is scheduled to be transmitted to the second powerline communication device. For example, one or more components in the transmitter 100 determine that data is to be sent to the second powerline communication device. In some implementations, the mode selection unit 205 determines that data is scheduled to be sent to the second powerline communication device. In some implementations, the FEC encode unit 102 may also determine whether data is available to be encoded for a scheduled transmission. The flow continues to block 304.

At block 304, an operational mode associated with the second powerline device is determined. In one implementation, the transmitter 100 determines the operational mode associated with the second powerline communication device. For example, the mode selection unit 205 of the transmitter 100 determines whether the operational mode associated with the second powerline communication device is MIMO mode or SISO mode (e.g., using one or more of the techniques described above with reference to FIG. 2). If the transmitter 100 determines that the operational mode associated with the second powerline communication device is MIMO mode, control flows to block 306. If the transmitter 100 determines that the operational mode associated with the second powerline communication device is SISO mode, control flows to block 308.

At block 306, after determining that the second powerline communication device is operating in MIMO mode, it is determined whether the transmitter is operating in MIMO mode. In one implementation, to determine whether the transmitter 100 is operating in MIMO mode, the mode selection unit 205 may determine whether the transmit chains of the transmitter 100 are configured in MIMO mode. For example, the mode selection unit 205 can check configuration registers, predefined memory locations, and/or the state of switches or multiplexers in the transmit chains to determine whether the transmitter 100 is operating in MIMO mode. If the mode selection unit 205 determines that the transmitter 100 is operating in MIMO mode, control flows to block 310. If the mode selection unit 205 determines that the transmitter 100 is not operating in MIMO mode, control flows to block 312.

At block 310, the operational mode of the transmitter is maintained. In one implementation, the mode selection unit 205 maintains the operational mode of the transmitter 100, and the transmitter 100 continues to operate in MIMO mode.

At block 312, the operational mode of the transmitter is dynamically changed to MIMO mode. In one implementation, the mode selection unit 205 dynamically changes the operational mode from SISO mode to MIMO mode. For example, the mode selection unit 205 changes the operational mode from SISO to MIMO mode when the transmitter 100 is initially in SISO mode (e.g., using one or more of the techniques described above with reference to FIG. 2). The mode selection unit 205 may change the operational mode to MIMO mode by configuring and utilizing both the first and second transmit chains for transmission. Once the operational mode of the transmitter 100 is set as MIMO mode, the transmitter 100 can transmit to the second powerline communication device using both the first and second transmit chains.

At block 308, after determining that the second powerline communication device is operating in SISO mode, it is determined whether the transmitter is operating in SISO mode. In one implementation, to determine whether the transmitter 100 is operating in SISO mode, the mode selection unit 205 may determine whether the transmit chains of the transmitter 100 are configured in SISO mode. For example, the mode selection unit 205 may check configuration registers, predefined memory locations, and/or the state of switches or multiplexers in the transmit chains to determine whether the transmitter 100 is operating in SISO mode. If the mode selection unit 205 determines that the transmitter 100 is operating in SISO mode, control flows to block 314. If the mode selection unit 205 determines that the transmitter 100 is not operating in SISO mode, control flows to block 316.

At block 314, the operational mode of the transmitter is maintained. In one implementation, the mode selection unit 205 maintains the operational mode of the transmitter 100, and the transmitter 100 continues to operate in SISO mode.

At block 316, the operational mode of the transmitter is dynamically changed to SISO mode. In one implementation, the mode selection unit 205 dynamically changes the operational mode from MIMO mode to SISO mode. For example, the mode selection unit 205 changes the operational mode from MIMO to SISO mode when the transmitter 100 is initially in MIMO mode (e.g., using one or more of the techniques described above with reference to FIG. 2). The mode selection unit 205 may change the operational mode to SISO mode by configuring and utilizing only the first transmit chain for transmission. Once the operational mode of the transmitter 100 is set as SISO mode, the transmitter 100 can transmit to the second powerline communication device using the first transmit chain.

It is noted that the operations illustrated in the flow diagrams of FIG. 3 may be performed by the mode selection unit 205 by various techniques as described above with reference to FIG. 2. It is noted, however, that although the description of FIG. 3 gives some examples of the mode selection unit 205 performing the operations of blocks 302-316, in other embodiments the mode selection unit 205 may perform only a subset of the operations of blocks 302-316 and other components of the transmitter 100 may perform the remaining operations, or the operations can be performed in a distributed manner across various components of the transmitter 100.

Figure 4:
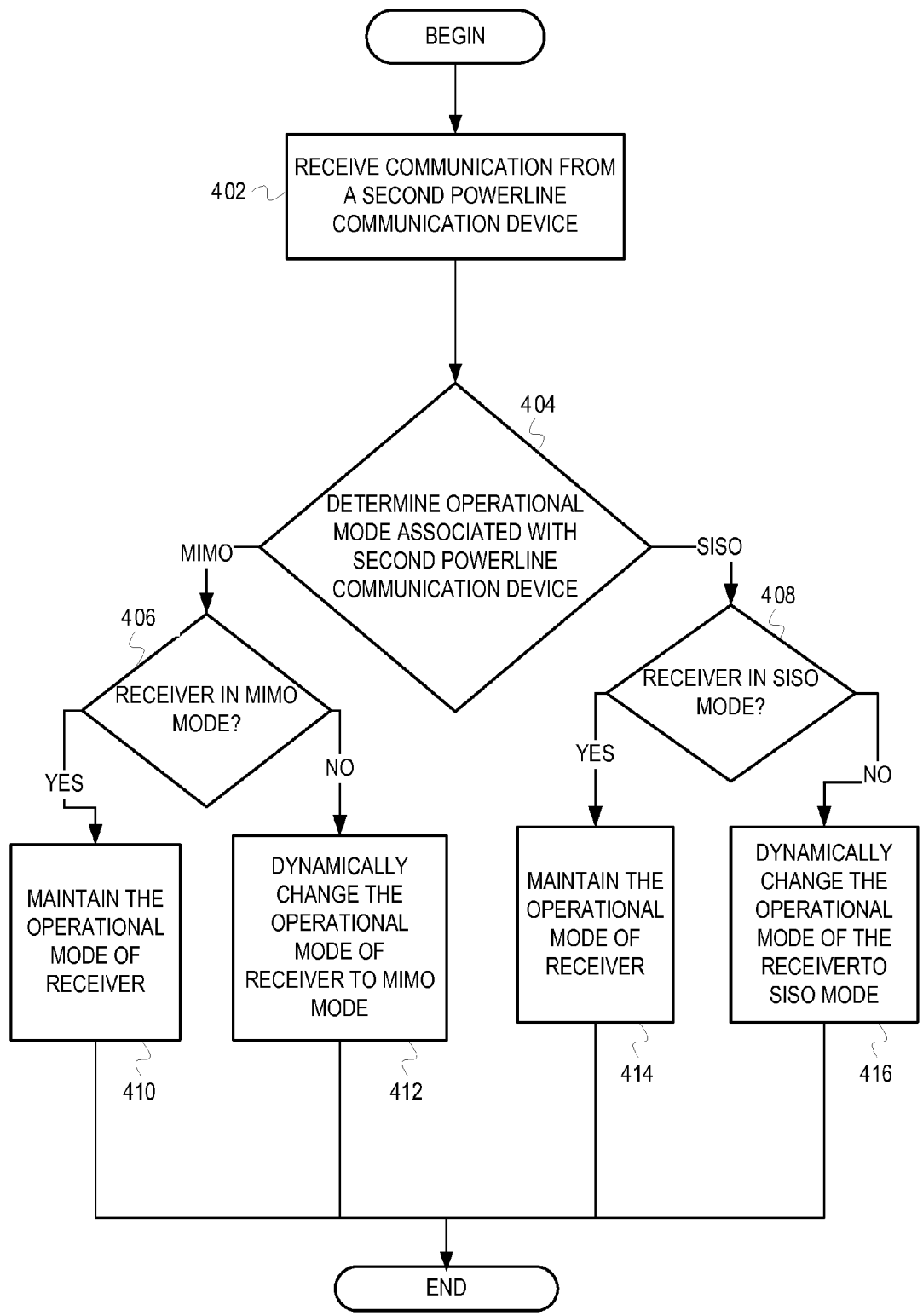
FIG. 4 illustrates a flow diagram of example operations of a receiver of an asymmetric mixed-mode transceiver of a powerline communication device in a powerline communication network.

FIG. 4 illustrates a flow diagram of example operations of a receiver of an asymmetric mixed-mode transceiver of a first powerline communication device (which may also be referred to as a destination powerline communication device) in a powerline communication network.

At block 402, a communication is received at the first powerline communication device from a second powerline communication device (which may also be referred to as a source powerline communication device). In one implementation, the receiver 150 (e.g., shown in FIGS. 1 and 2) receives the communication from the second powerline communication device. For example, one or more components in the receiver 150 determine whether any transmissions are present on L-N or L-G channels. The flow continues to block 404.

At block 404, an operational mode associated with the second powerline communication device is determined. In one implementation, the receiver 150 determines the operational mode associated with the second powerline communication device. For example, the mode selection unit 205 of the receiver 150 determines whether the operational mode associated with the second powerline communication device is MIMO mode or SISO mode (e.g., using one or more of the techniques described above with reference to FIG. 2). If the receiver 150 determines that the operational mode associated with the second powerline communication device is MIMO mode, control flows to block 406. If the receiver 150 determines that the operational mode associated with the second powerline communication device is SISO mode, control flows to block 408.

At block 406, after determining that the second powerline communication device is operating in MIMO mode, it is determined whether the receiver is operating in MIMO mode. In one implementation, to determine whether the receiver 150 is operating in MIMO mode, the mode selection unit 205 may determine whether the receive chains of the receiver 150 are configured in MIMO mode. For example, the mode selection unit 205 can check configuration registers, predefined memory locations, and/or the state of switches or multiplexers in the receive chains to determine whether the receiver 150 is operating in MIMO mode. If the mode selection unit 205 determines that the receiver 150 is operating in MIMO mode, control flows to block 410. If the mode selection unit 205 determines that the receiver 150 is not operating in MIMO mode, control flows to block 412.

At block 410, the operational mode of the receiver is maintained. In one implementation, the mode selection unit 205 maintains the operational mode of the receiver 150, and the receiver 150 continues to operate in MIMO mode.

At block 412, the operational mode of the receiver is dynamically changed to MIMO mode. In one implementation, the mode selection unit 205 dynamically changes the operational mode from SISO mode to MIMO mode. For example, the mode selection unit 205 changes the operational mode from SISO to MIMO mode when the receiver 150 is initially in SISO mode (e.g., using one or more of the techniques described above with reference to FIG. 2). The mode selection unit 205 may change the operational mode to MIMO mode by processing input signals received on both the first and second receive chains. Once the operational mode of the receiver 150 is set as MIMO mode, the receiver 150 can receive communications from the second powerline communication device using both the first and second receive chains (e.g., on both the first and second powerline communication channels).

At block 408, after determining that the second powerline communication device is operating in SISO mode, it is determined whether the receiver is operating in SISO mode. In one implementation, to determine whether the receiver 150 is operating in SISO mode, the mode selection unit 205 may determine whether receive chains of the receiver 150 are configured in SISO mode. For example, the mode selection unit 205 may check configuration registers, predefined memory locations, and/or the state of switches or multiplexers in the receive chains to determine whether the receiver 150 is operating in SISO mode. If the mode selection unit 205 determines that the receiver 150 is operating in SISO mode, control flows to block 414. If the mode selection unit 205 determines that the receiver 150 is not operating in SISO mode, control flows to block 416.

At block 414, the operational mode of the receiver is maintained. In one implementation, the mode selection unit 205 maintains the operational mode of the receiver 150, and the receiver 150 continues to operate in SISO mode.

At block 416, the operational mode of the receiver is dynamically changed to SISO mode. In one implementation, the mode selection unit 205 dynamically changes the operational mode from MIMO mode to SISO mode. For example, the mode selection unit 205 changes the operational mode from MIMO to SISO mode when the receiver 150 is initially in MIMO mode (e.g., using one or more of the techniques described above with reference to FIG. 2). The mode selection unit 205 may change the operational mode to SISO mode by configuring and utilizing only the first receive chain. Once the operational mode of the receiver 150 is set as SISO mode, the receiver 150 can receive from the second powerline communication device using the first receive chain.

It is noted that the operations illustrated in the flow diagrams of FIG. 4 may be performed by the mode selection unit 205 by various techniques as described above with reference to FIG. 2. It is noted, however, that although the description of FIG. 4 gives some examples of the mode selection unit 205 performing the operations of blocks 402-416, in other embodiments the mode selection unit 205 may perform only a subset of the operations of blocks 402-416 and other components of the receiver 150 may perform the remaining operations, or the operations can be performed in a distributed manner across various components of the receiver 150.

Figure 5:
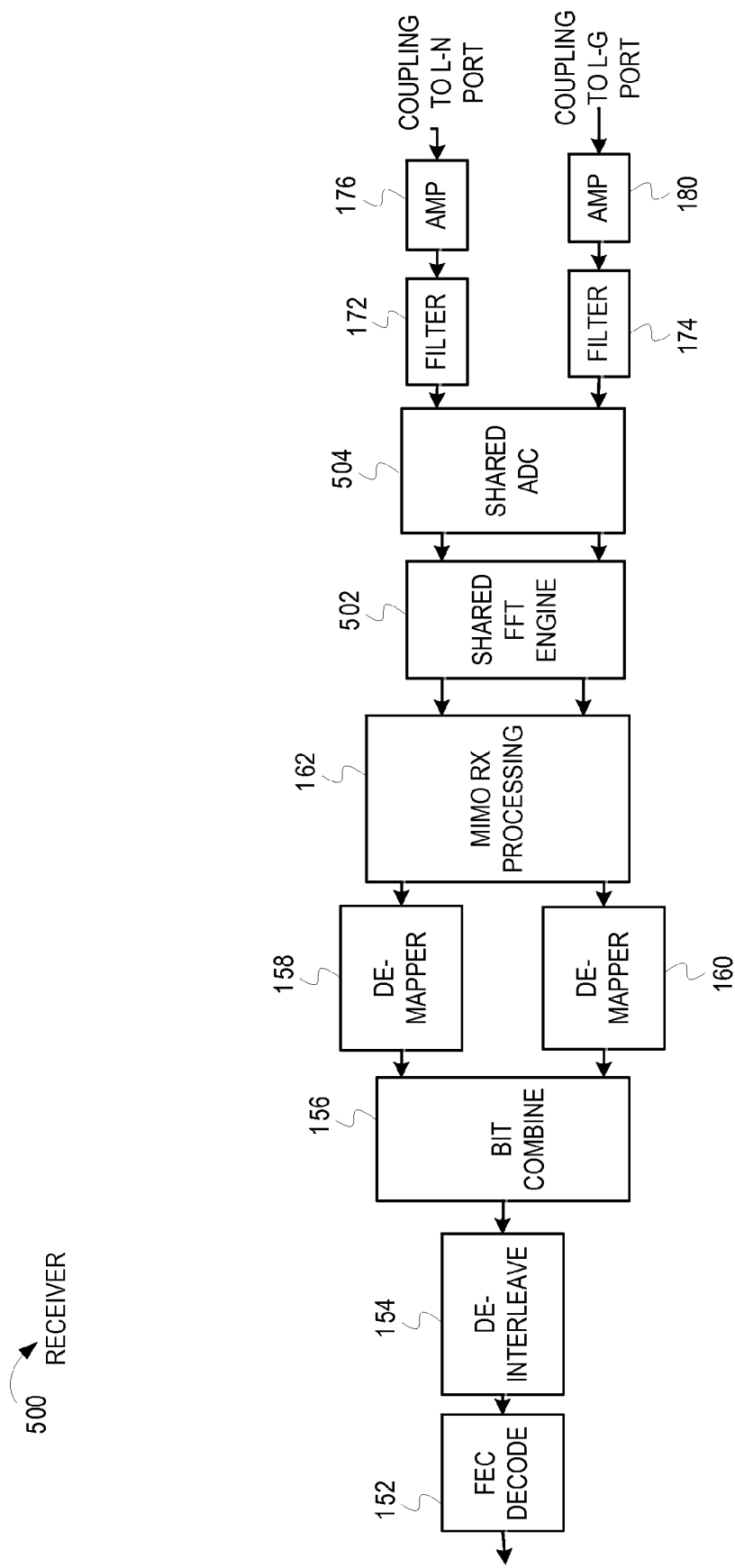
FIG. 5 depicts an example block diagram of a receiver of an asymmetric mixed-mode transceiver having a shared FFT engine and a shared ADC.
Figure 7A:
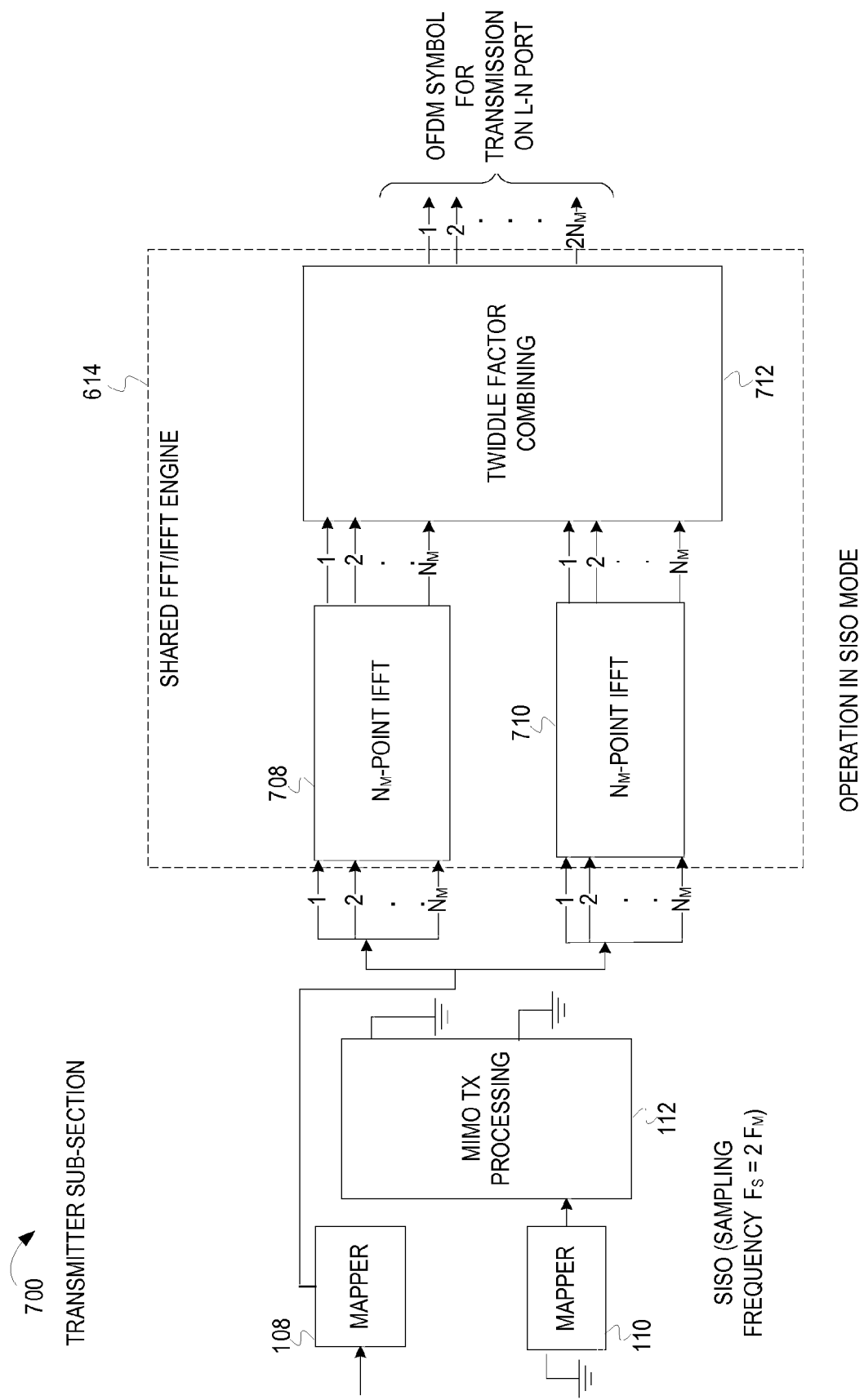
FIG. 7A depicts an example block diagram of a sub-section of a transmitter of an asymmetric mixed-mode transceiver with a shared IFFT engine for operation in SISO mode.
Figure 7B:
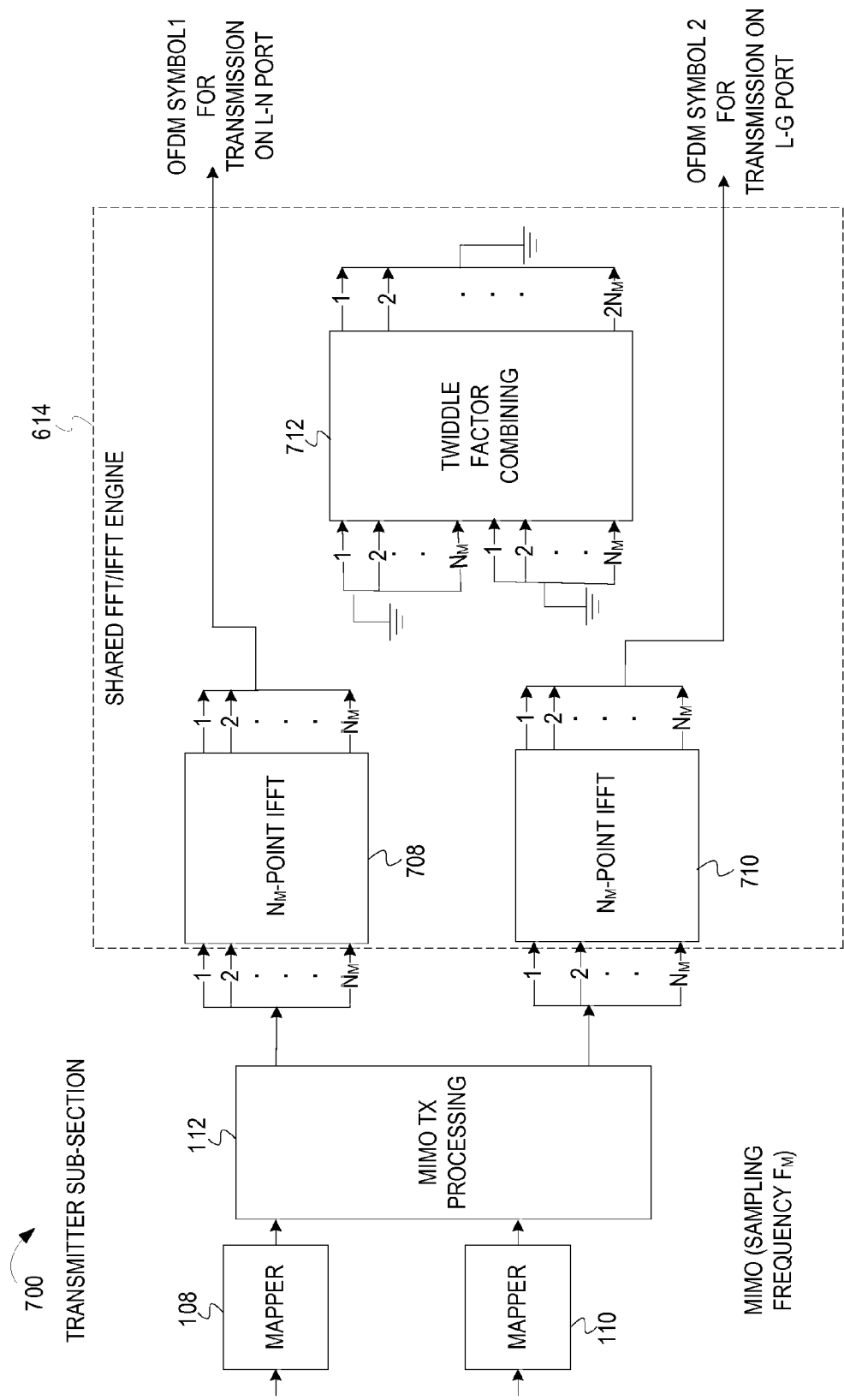
FIG. 7B depicts an example block diagram of a sub-section of a transmitter of an asymmetric mixed-mode transceiver with a shared FFT/IFFT engine for operation in MIMO mode.
Figure 8B:
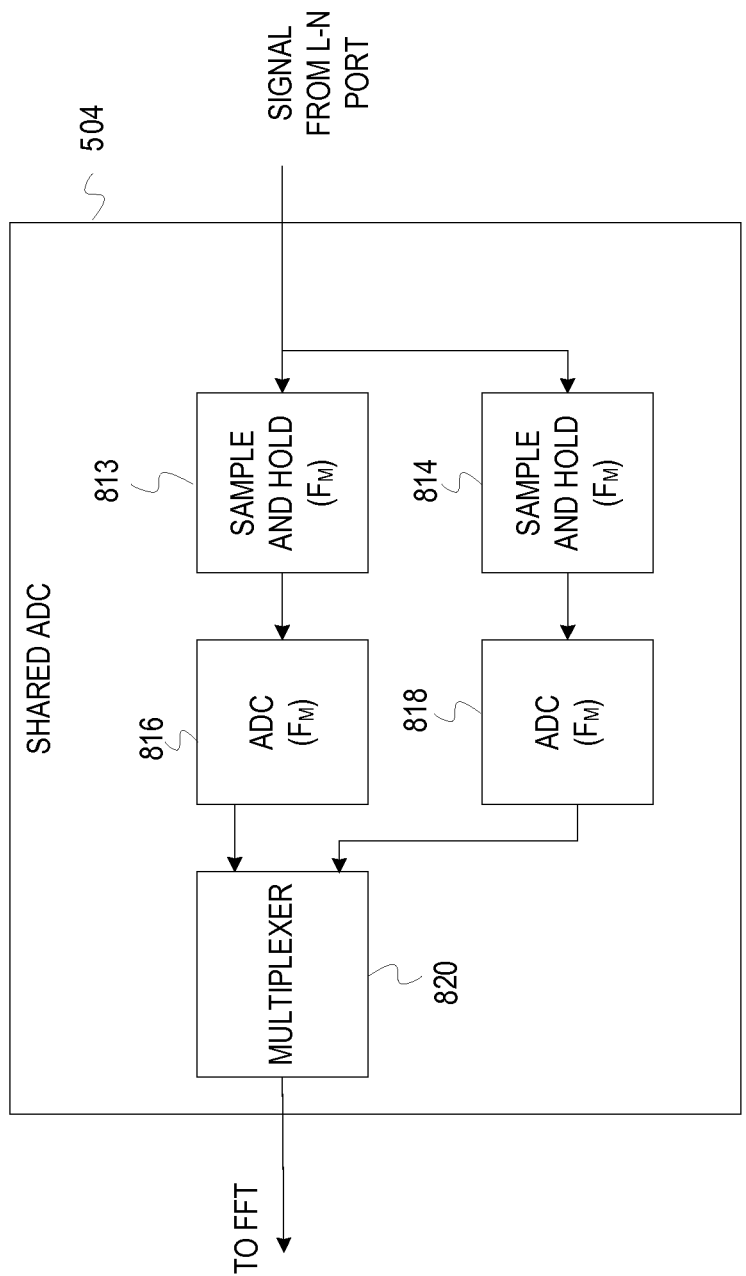
FIG. 8B depicts one implementation of a shared ADC for a receiver of an asymmetric mixed-mode transceiver for operations in SISO mode.
Figure 8C:
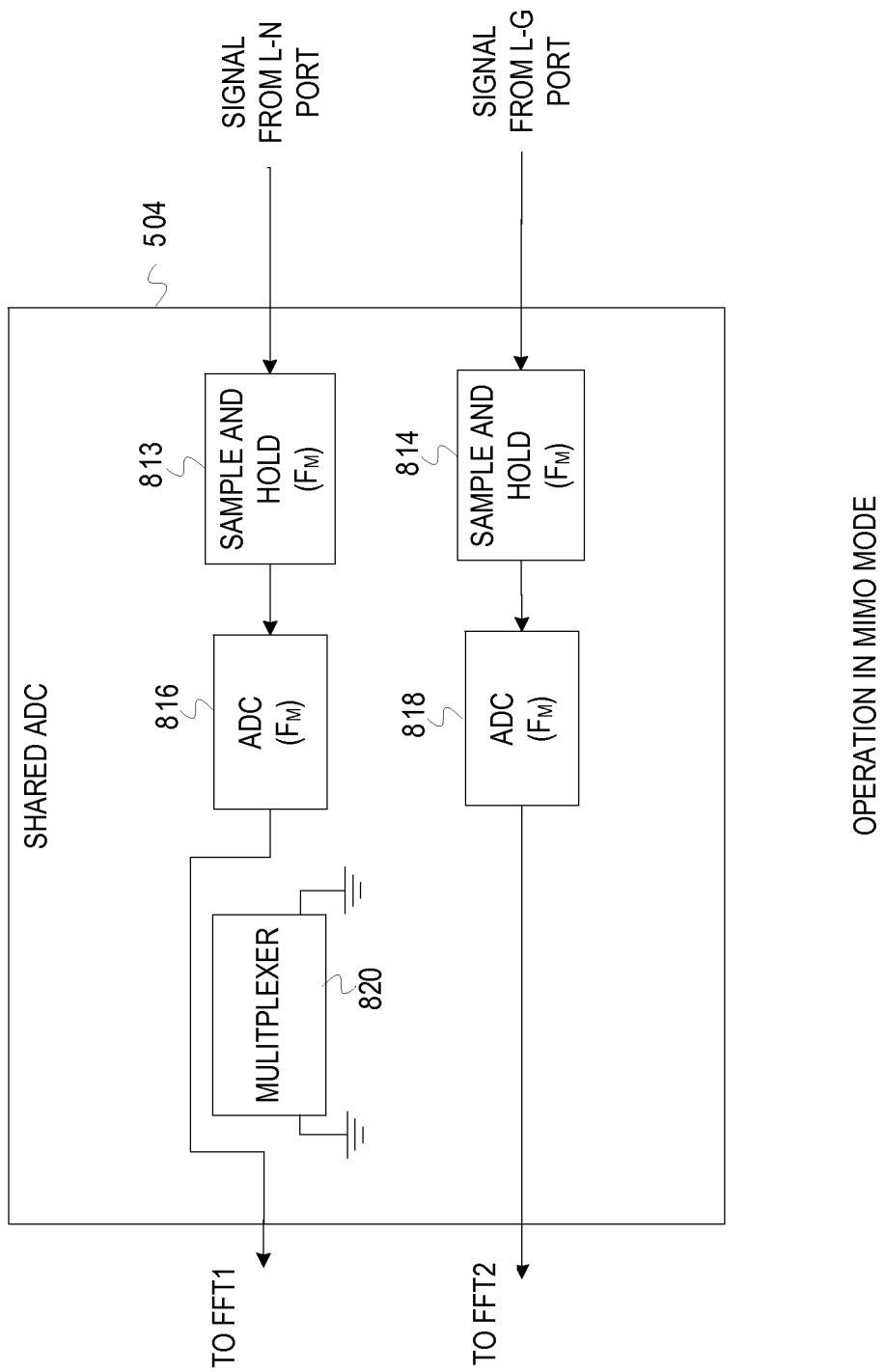
FIG. 8C depicts one implementation of a shared ADC for a receiver of an asymmetric mixed-mode transceiver for operations in MIMO mode.

FIG. 5 depicts an example conceptual diagram of a receiver of an asymmetric mixed-mode transceiver having a shared FFT engine and a shared ADC. FIG. 5 depicts a receiver 500 which is similar to the receiver 150 in FIG. 1, except for the $N_S$ FFT unit 164, the $N_M$ FFT unit 166, the ADC 168 and the ADC 170. The $N_S$ FFT unit 164 and the $N_M$ FFT unit 166 may be replaced by a shared FFT engine 502. The ADC 168 and the ADC 170 may be replaced by a shared ADC 504. The receiver 500 with the shared ADC 504 and the shared FFT engine 502 can have fewer components as compared to the receiver 150, consume less power and incur lower costs. The shared ADC 504 and the shared FFT engine 502 between the first and second transmit chains may also simplify the architecture and reduce the area of the receiver 150. The shared FFT engine 502 and the shared ADC 504 may be utilized in the asymmetric mixed-mode transceiver in static implementation since the operational mode of the asymmetric mixed-mode transceiver is known before communication is initiated. FIGS. 6, 7A and 7B describe some example implementations of the shared FFT engine 502. FIGS. 8A, 8B and 8C describe some example implementations of the shared ADC 504.

It is noted, that FIG. 5 depicts one implementation of the receiver 500 of the asymmetric mixed-mode transceiver. It is noted that different implementations are possible for the asymmetric mixed-mode transceiver. For example, in other implementations, the asymmetric mixed-mode transceiver may comprise a shared FFT engine with separate ADCs in the receiver, a shared ADC with separate FFT engines in the receiver, and separate FFT engines with separate ADCs in the receiver. Also, in some implementations, the shared FFT engine 502 of FIG. 5 may be implemented as the common FFT/IFFT engine for transmitter and receiver sections of the asymmetric mixed-mode transceiver (as described in FIG. 6) to perform FFT and IFFT operations respectively. In other implementations, the asymmetric mixed-mode transceiver can be implemented with a shared IFFT engine for the two transmit chains and a shared FFT engine for the two receive chains.

Figure 6:
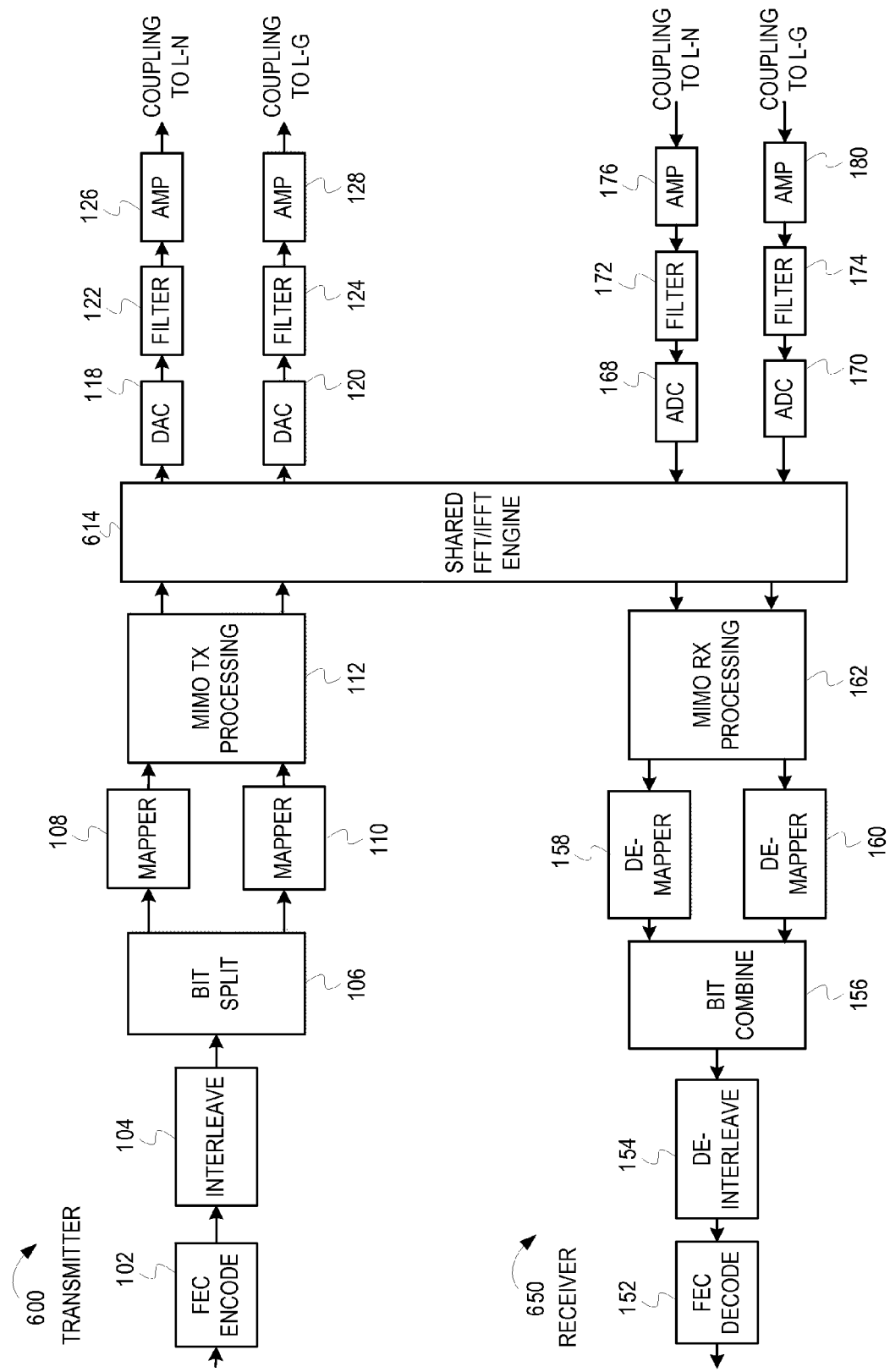
FIG. 6 depicts an example block diagram of an asymmetric mixed-mode transceiver having a shared FFT/IFFT engine between a transmitter and a receiver.

FIG. 6 depicts an example block diagram of an asymmetric mixed-mode transceiver having a shared FFT/IFFT engine between a transmitter and a receiver. FIG. 6 includes a transmitter 600 and a receiver 650 of the asymmetric mixed-mode transceiver. The transmitter 600 is similar to the transmitter 100 except that the $N_S$ IFFT unit 114 and the $N_M$ IFFT unit 116 may be replaced by a shared FFT/IFFT engine 614. Also the receiver 650 is similar to the receiver 150 except that the $N_S$ FFT unit 164 and the $N_M$ FFT unit 166 may be replaced by the shared FFT/IFFT engine 614. The first and second transmit chains can share the FFT/IFFT engine 614 with the first and second receive chains of the asymmetric mixed-mode transceiver.

In some implementations, the shared FFT/IFFT engine 614 can reduce the complexity and area of the asymmetric mixed-mode transceiver. The shared FFT/IFFT engine 614 can convert time-domain signals to frequency-domain signals for the first and second receive chains. Similarly, the shared FFT/IFFT engine 614 can convert frequency-domain signals to time-domain signals for the first and second transmit chains. The operation of the shared FFT/IFFT engine 614 may differ based on the operational mode of the asymmetric mixed-mode transceiver. FIGS. 7A and 7B depict example operations of the shared FFT/IFFT engine 614 for a transmitter sub-section of the asymmetric mixed-mode transceiver for SISO and MIMO mode operations.

FIG. 7A depicts an example block diagram of a sub-section of a transmitter of an asymmetric mixed-mode transceiver with a shared IFFT engine for operation in SISO mode. FIG. 7A includes a mapper 108, a mapper 110, a MIMO TX Processing unit 112 and the shared FFT/IFFT engine 614 (as described above with reference to FIG. 6). The mapper 108, the mapper 110 and the MIMO TX Processing unit 112 have similar functions as described in FIG. 1. The shared FFT engine 614 includes an $N_M$ point IFFT unit 708, an $N_M$ point IFFT unit 710 and a twiddle factor combining unit 712.

In one implementation, during SISO mode operation, a signal from mapper 108 may be fed into the $N_M$ point IFFT unit 708 and the $N_M$ point IFFT unit 710. Although FIG. 7A depicts the same signal being fed into the two IFFT units, the signal fed into the $N_M$ point IFFT unit 708 and the signal fed into the $N_M$ point IFFT unit 710, may not necessarily be the same. For example, the signal fed into the $N_M$ point IFFT unit 710 may be on a different carrier frequency as compared to the signal fed into the $N_M$ point IFFT unit 708. For SISO mode operation, the mapper 110 and the MIMO TX processing unit 112 may be grounded or powered off. The $N_M$ point IFFT unit 708 and the $N_M$ point IFFT unit 710 may compute two $N_M$ point wide IFFT for the input signals. The twiddle factor combining unit 712 may combine the two $N_M$ point wide IFFTs into a single $2N_M$ point wide IFFT. For example, the twiddle factor combining unit 712 may combine the two $N_M$ point wide IFFTs by multiplying them with one or more coefficients. The $2N_M$ point wide IFFT or an $N_S$ point wide IFFT comprises the OFDM digital symbol for transmission on the L-N port. The OFDM digital symbol may be fed to a DAC clocked at a frequency $F_S$ (i.e., sampling frequency for SISO mode).

FIG. 7B depicts an example block diagram of a sub-section of a transmitter of an asymmetric mixed-mode transceiver with a shared FFT/IFFT engine for operation in MIMO mode. FIG. 7B includes a mapper 108, a mapper 110, a MIMO TX processing unit 112, and the shared FFT/IFFT engine 614 (as described above with reference to FIG. 6). The shared FFT/IFFT engine 614 may include the $N_M$ point IFFT unit 708, the $N_M$ point IFFT unit 710, and the twiddle factor combining unit 712 (as described above with reference to FIG. 7A).

In one implementation, during the MIMO mode operation, the twiddle factor combining unit 712 may be grounded or powered off. The mapper 110 and the MIMO TX processing unit 112 may be operational during the MIMO mode operation. The mapper 108 and the mapper 110 may send two symbol streams to the MIMO TX processing unit 112. The MIMO TX processing unit 112 may perform one or more MIMO operations (e.g., spatial multiplexing, beamforming, space-time coding, etc.) and send the symbol streams to the $N_M$ point IFFT unit 708 and the $N_M$ point IFFT unit 710. The $N_M$ point IFFT unit 708 and the $N_M$ point IFFT unit 710 can convert frequency domain signals into time domain signals. The output of the $N_M$ point IFFT unit 708 may include an OFDM symbol for transmission on the L-N port. Similarly, the output of the $N_M$ point IFFT unit 710 may include an OFDM symbol for transmission on the L-G port. The OFDM symbols may be fed to DACs clocked at a frequency $F_M$ (i.e., the sampling frequency of MIMO mode).

FIG. 8A depicts one implementation of a shared ADC for a receiver of an asymmetric mixed-mode transceiver for operations in SISO mode. FIG. 8A includes the shared ADC 504 (as described above with reference to FIG. 5). In one implementation, the shared ADC 504 includes a multiplexer 820, an ADC 816, an ADC 818, a sample and hold block 812, and a sample and hold block 814. The shared ADC 504 can utilize an interleaved ADC architecture with the ADC 816 and the ADC 818. For example, the ADC 816 and the 818 may be configured to operate at a sampling at frequency $F_M$ with the ADC 816 producing even samples and the ADC 818 producing odd samples of an input signal. The sample and hold block 812 is clocked at a frequency $F_S$, and the sample and hold block 814 is clocked at a frequency $F_M$.

In one implementation, during SISO mode operation, the sample and hold block 812 receives a signal from the L-N port. The sample and hold block 814 is grounded or powered off during SISO mode operation. The sample and hold block 812 can sample the received signal and feed the sampled signal to the ADCs 816 and 818. The sample and hold block 812 may feed the sampled signal to the ADCs 816 and 818 in a time-offset manner such that the ADCs 816 and 818 may not receive the same input signal. For example, the sample and hold block 812 may feed the ADCs 816 and 818 such that the ADC 816 receives even samples and the ADC 818 receives odd samples of the sampled signal. The ADCs 816 and 818 can convert analog signals input to them into digital signals, and send even and odd samples of a digital signal to the multiplexer 820. The multiplexer 820 can multiplex the even and odd samples of the digital signal and send the multiplexed signal to an FFT unit (e.g., the $N_S$ FFT unit 164).

FIG. 8B depicts one implementation of a shared ADC for a receiver of an asymmetric mixed-mode transceiver for operations in SISO mode. FIG. 8B depicts another implementation of the shared ADC 504 for operation in SISO mode (different from the implementation in FIG. 8A). The shared ADC 504 in FIG. 8B is similar to the shared ADC 504 in FIG. 8A except the sample and hold block 812 can be replaced by the sample and hold block 813. The sample and hold block 813 is clocked at a frequency $F_M$, similar to the sample and hold block 814. The shared ADC 504 utilizes a similar interleaved ADC architecture (as described in FIG. 8A) with the ADC 816 and the ADC 818 producing even and odd samples of an input signal.

In one implementation, during SISO mode operation, the sample and hold blocks 813 and 814 receive a signal from the L-N port. The sample and hold blocks 813 and 814 may receive the signal in a time-offset manner. The sample and hold blocks 813 and 814 can sample the input signal and feed the sampled signals to the ADCs 816 and 818. For example, the sample and hold block 813 may feed even samples of the signal received at the L-N port to the ADC 816 and the sample and hold block 814 may feed odd samples of the signal received at the L-N port. The ADCs 816 and 818 can convert analog signals input to them into digital signals, and send even and odd samples of a digital signal to the multiplexer 820. The multiplexer 820 can multiplex the even and odd samples of the digital signal and send the multiplexed signal to an FFT unit (e.g., the $N_S$ FFT unit 164).

It is noted that the implementations of the shared ADC described in FIGS. 8A and 8B can be utilized for the receiver of the asymmetric mixed-mode transceiver in static implementation when $F_S=2F_M$. Although, FIGS. 8A and 8B describe that the ADC 816 operates on even samples of an analog signal and the ADC 818 operates on odd samples of the analog signal, in other embodiments the ADC 816 may operate on the odd samples of the analog signal and the ADC 818 may operate on the even samples of the analog signal.

FIG. 8C depicts one implementation of a shared ADC for a receiver of an asymmetric mixed-mode transceiver for operations in MIMO mode. FIG. 8C includes the shared ADC 504 (as described above with reference to FIG. 5). The shared ADC 504 in FIG. 8C is similar to the shared ADC 504 in FIG. 8B except that the multiplexer 820 may be grounded or turned off. Also, the shared ADC 504 may not utilize an interleaved ADC architecture (as described in FIG. 8A). Instead, the ADCs 816 and 818 can operate on separate signals received at the L-N and L-G ports, respectively.

In one implementation, during MIMO mode operation, the sample and hold block 813 can receive a signal from the L-N port. The sample and hold block 814 can receive a signal from the L-G port. The sample and hold blocks 813 and 814 can sample the received signals from L-N and L-G ports and feed the sampled signals to the ADCs 816 and 818, respectively. The ADCs 816 and 818 can convert analog signals input to them into digital signals, and send the digital signals to FFT units. For example, the ADCs 816 and 818 can send the digital signals to the $N_S$ FFT unit 164 and the $N_M$ FFT unit 166, respectively.

It should be understood that FIGS. 1-8C and the operations described herein are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-8C depict a 2×2 asymmetric mixed-mode transceiver, it is noted that the asymmetric mixed-mode transceiver as described above is not limited to 2×2 powerline communication. The asymmetric mixed-mode transceiver may be implemented for any combination of TX/RX ports in a 2×N (N=2, 3, 4) MIMO powerline communication system. Although, in some implementations, the asymmetric mixed-mode transceiver may include one or more shared components (e.g., a shared FFT/IFFT engine between the transmitter 100 and the receiver 150, a shared ADC between the first and second receive chains, etc.), it is noted that in some embodiments the asymmetric mixed-mode transceiver may be implemented with separate components (i.e., without sharing of the components), e.g., as shown in FIGS. 1-2.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
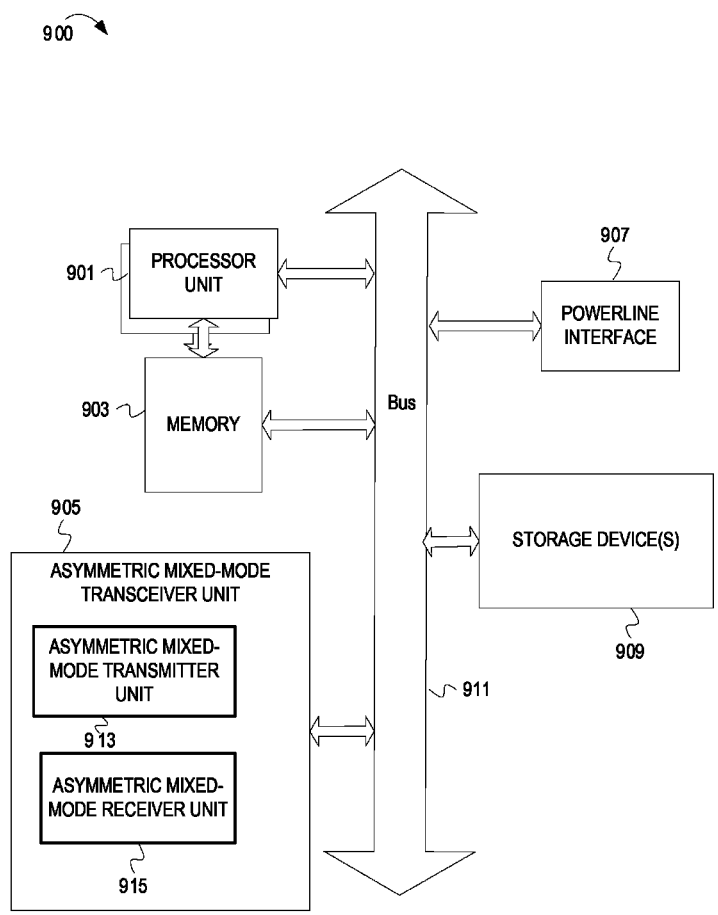
FIG. 9 depicts an example network device.

FIG. 9 depicts an example network device 900. In some implementations, the network device 900 may be one of a desktop computer, a gaming console, a smart appliance, a digital video recorder (DVR), a television, and other network devices with powerline communication capabilities. The network device 900 includes a processor unit 901 (possibly including multiple processors, multiple cores, multiple nodes, and/or implementing multi-threading, etc.). The network device 900 includes memory 903. The memory 903 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The network device 900 also includes a bus 911 (e.g., PCI, PCI-Express, AHB™, AXI™, NoC, etc.), a powerline interface 907 (e.g., 2-wire interface, 3-wire interface, etc.), a storage device(s) 909 (e.g., optical storage, magnetic storage, etc.), and an asymmetric mixed-mode transceiver unit 905. The asymmetric mixed-mode transceiver unit 905 includes an asymmetric mixed-mode transmitter unit 913 and an asymmetric mixed-mode receiver unit 915. The asymmetric mixed-mode transceiver unit 905 may be configured to implement some or all of the functionality described above with reference to FIGS. 1-8C. For example, the asymmetric mixed-mode transceiver unit 905 may be configured in a static implementation or may be configured in a dynamic implementation. The asymmetric mixed-mode transceiver enables the network device 900 to communicate with SISO or MIMO devices in a powerline communication network as described above.

Any one of these functionalities may be partially (or entirely) implemented in hardware and/or program instructions. For example, the functionality may be implemented with an application specific integrated circuit, in logic implemented in the processing unit 901, in a co-processor on a peripheral device or card, etc. In some implementations, one or more components may be shared between the asymmetric mixed-mode transmitter unit 913 and the asymmetric mixed-mode receiver unit 915. Further, realizations may include fewer or additional components not illustrated in FIG. 9 (e.g., video cards, audio cards, additional network interfaces, peripheral devices, etc.). The processor unit 901, the storage device(s) 909, the powerline interface 907 and the asymmetric mixed-mode transceiver unit 905 are coupled to the bus 911. Although illustrated as being coupled to the bus 911, the memory 903 may be coupled to the processor unit 901.

While the embodiments are described with reference to various implementations and exploitations, it will be understood that these embodiments are illustrative and that the scope of the inventive subject matter is not limited to them. In general, techniques for implementing an asymmetric mixed-mode transceiver as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A powerline communication transmitter comprising:
a network interface;
a mode selection unit coupled with the network interface, the mode selection unit configured to:
determine whether an operational mode associated with a destination powerline communication device communicatively coupled to the network interface is a multiple-input multiple-output (MIMO) mode or a single-input single-output (SISO) mode;
determine whether the operational mode of the destination powerline communication device matches an operational mode of the powerline communication transmitter; and
dynamically change the operational mode of the powerline communication transmitter to either the MIMO mode or the SISO mode to match the operational mode of the destination powerline communication device in response to determining the operational mode of the destination powerline communication device does not match the operational mode of the powerline communication transmitter.

2. The powerline communication transmitter of claim 1, wherein the mode selection unit is further configured to:
in response to determining to dynamically change the operational mode from the SISO mode to the MIMO mode, dynamically enable both a first transmit chain associated with a first powerline communication channel and a second transmit chain associated with a second powerline communication channel to dynamically change the operational mode from the SISO mode to the MIMO mode; and
in response to determining to dynamically change the operational mode from the MIMO mode to the SISO mode, dynamically enable the first transmit chain associated with the first powerline communication channel and disable the second transmit chain associated with the second powerline communication channel to dynamically change the operational mode from the MIMO mode to the SISO mode.

3. The powerline communication transmitter of claim 2, wherein the mode selection unit configured to disable the second transmit chain comprises the mode selection unit further configured to turn off power to one or more components of the second transmit chain.

4. The powerline communication transmitter of claim 2, wherein the mode selection unit configured to disable the second transmit chain comprises the mode selection unit further configured to instruct one or more components of the second transmit chain to bypass the second transmit chain.

5. The powerline communication transmitter of claim 2, wherein the first transmit chain is configured to operate at a first frequency and the second transmit chain is configured to operate at a second frequency, wherein the first frequency is greater than the second frequency.

6. The powerline communication transmitter of claim 1, wherein the mode selection unit configured to determine whether the operational mode associated with the destination powerline communication device is the MIMO mode or the SISO mode comprises the mode selection unit configured to:
determine a protocol utilized by the destination powerline communication device; and
determine the operational mode associated with the destination powerline communication device based on the protocol utilized by the destination powerline communication device.

7. The powerline communication transmitter of claim 1, wherein the mode selection unit configured to determine whether the operational mode associated with the destination powerline communication device is the MIMO mode or the SISO mode comprises the mode selection unit configured to:
determine a destination network address of the destination powerline communication device; and
determine the operational mode of the destination powerline communication device based on the destination network address.

8. A powerline communication receiver comprising:
a network interface;
a mode selection unit coupled with the network interface, the mode selection unit configured to:
receive a communication from a source powerline communication device communicatively coupled to the network interface;
determine whether an operational mode associated with the source powerline communication device is a multiple-input multiple-output (MIMO) mode or a single-input single-output (SISO) mode;
determine whether the operational mode of the source powerline communication device matches an operational mode of the powerline communication receiver; and
dynamically change the operational mode of the powerline communication receiver to either the MIMO mode or the SISO mode to match the operational mode of the source powerline communication device in response to determining the operational mode of the source powerline communication device does not match the operational mode of the powerline communication receiver.

9. The powerline communication receiver of claim 8, wherein the mode selection unit is further configured to:
in response to determining to dynamically change the operational mode from the SISO mode to the MIMO mode, dynamically enable both a first receive chain associated with a first powerline communication channel and a second receive chain associated with a second powerline communication channel; and
in response to determining to dynamically change the operational mode from the MIMO mode to the SISO mode, dynamically enable the first receive chain associated with the first powerline communication channel and disable the second receive chain associated with the second powerline communication channel.

10. The powerline communication receiver of claim 9, wherein the first receive chain is configured to operate at a first frequency and the second receive chain is configured to operate at a second frequency, wherein the first frequency is greater than the second frequency.

11. The powerline communication receiver of claim 8, wherein the mode selection unit configured to determine whether the operational mode associated with the source powerline communication device is the MIMO mode or the SISO mode comprises the mode selection unit configured to:
   determine frame-control information included in a network packet received from the source powerline communication device; and
   determine the operational mode of the source powerline communication device based on the frame-control information included in the network packet.

12. An apparatus comprising:
   a powerline communication transmitter configured to:
      determine whether an operational mode associated with a destination powerline communication device is a multiple-input multiple-output (MIMO) mode or a single-input single-output (SISO) mode;
      determine whether the operational mode of the destination powerline communication device matches an operational mode of the powerline communication transmitter;
      dynamically change the operational mode of the powerline communication transmitter to either the MIMO mode or the SISO mode to match the operational mode of the destination powerline communication device in response to determining the operational mode of the destination powerline communication device does not match the operational mode of the powerline communication transmitter; and
   a powerline communication receiver configured to:
      receive a communication from a source powerline communication device;
      determine whether an operational mode associated with the source powerline communication device is the MIMO mode or the SISO mode;
      determine whether the operational mode of the source powerline communication device matches an operational mode of the powerline communication receiver; and
      dynamically change the operational mode of the powerline communication receiver to either the MIMO mode or the SISO mode to match the operational mode of the source powerline communication device in response to determining the operational mode of the source powerline communication device does not match the operational mode of the powerline communication receiver.

13. The apparatus of claim 12, wherein:
   in response to determining to dynamically change the operational mode of the powerline communication transmitter from the SISO mode to the MIMO mode, the powerline communication transmitter is configured to dynamically enable both a first transmit chain associated with a first powerline communication channel and a second transmit chain associated with a second powerline communication channel; and
   in response to determining to dynamically change the operational mode of the powerline communication transmitter from the MIMO mode to the SISO mode, the powerline communication transmitter is configured to dynamically enable the first transmit chain associated with the first powerline communication channel and disable the second transmit chain associated with the second powerline communication channel.

14. The apparatus of claim 13, wherein the first transmit chain is configured to operate at a first frequency and the second transmit chain is configured to operate at a second frequency, wherein the first frequency is greater than the second frequency.

15. The apparatus of claim 12, wherein:
   in response to determining to dynamically change the operational mode of the powerline communication receiver from the SISO mode to the MIMO mode, the powerline communication receiver is configured to dynamically enable both a first receive chain associated with a first powerline communication channel and a second receive chain associated with a second powerline communication channel; and
   in response to determining to dynamically change the operational mode of the powerline communication receiver from the MIMO mode to the SISO mode, the powerline communication receiver is configured to dynamically enable the first receive chain associated with the first powerline communication channel and disable the second receive chain associated with the second powerline communication channel.

16. The apparatus of claim 15, wherein the first receive chain is configured to operate at a first frequency and the second receive chain is configured to operate at a second frequency, wherein the first frequency is greater than the second frequency.

17. An apparatus comprising:
   a powerline communication transmitter including a first transmit chain and a second transmit chain, wherein the first and second transmit chains of the powerline communication transmitter are configurable to operate in a multiple-input multiple-output (MIMO) mode, and the first transmit chain of the powerline communication transmitter is configurable to operate in a single-input single-output (SISO) mode;
   a powerline communication receiver including a first receive chain and a second receive chain, wherein the first and second receive chains of the powerline communication receiver are configurable to operate in the MIMO mode, and the first receive chain of the powerline communication receiver is configurable to operate in the SISO mode; and
   a shared fast Fourier transform (FFT) engine included in the powerline communication transmitter and the powerline communication receiver, wherein the shared FFT engine is shared by the powerline communication transmitter and the powerline communication receiver.

18. The apparatus of claim 17, wherein the shared FFT engine comprises a shared fast Fourier transform and inverse fast Fourier transform engine.

19. The apparatus of claim 17, wherein, if the powerline communication transmitter and receiver are configured in the SISO mode, the second transmit chain and the second receive chain are disabled.

20. The apparatus of claim 17, wherein, if the powerline communication transmitter and receiver are configured in the SISO mode, signals processed by the second transmit chain and the second receive chain are ignored.

21. The apparatus of claim 17, wherein:
the first transmit chain is configurable to operate at approximately a first frequency when the powerline communication transmitter is configured to operate in the MIMO mode, and configurable to operate at approximately a second frequency when the powerline communication transmitter is configured to operate in the SISO mode, and wherein the second transmit chain is configurable to operate at approximately the first frequency when the powerline communication transmitter is configured to operate in the MIMO mode; and
the first receive chain is configurable to operate at approximately the first frequency when the powerline communication receiver is configured to operate in the MIMO mode, and configurable to operate at approximately the second frequency when the powerline communication receiver is configured to operate in the SISO mode, and wherein the second receive chain is configurable to operate at approximately the first frequency when the powerline communication receiver is configured to operate in the MIMO mode.

22. The apparatus of claim 21, wherein the second frequency associated with the SISO mode is greater than the first frequency associated with the MIMO mode.

23. The apparatus of claim 17, wherein the first transmit and receive chains are associated with a first powerline communication channel, and the second transmit and receive chains are associated with a second powerline communication channel.

24. The apparatus of claim 17, wherein the powerline communication transmitter comprises:
a forward error correction encode unit;
an interleave unit coupled with the forward error correction encode unit and also coupled with a bit split unit;
the bit split unit coupled with a first mapper and a second mapper;
a multiple-input multiple-output transmitter processing unit coupled with the first mapper and the second mapper;
the shared FFT engine coupled with the multiple-input multiple-output transmitter processing unit and also coupled with a first digital-to-analog converter and a second digital-to-analog converter;
a first filter coupled with the first digital-to-analog converter and also coupled with a first amplifier;
a second filter coupled with the second digital-to-analog converter and also coupled with a second amplifier;
the first amplifier coupled with a line-neutral transmission port; and
the second amplifier coupled with a line-ground transmission port.

25. The apparatus of claim 24, wherein the powerline communication transmitter further comprises a mode selection unit coupled with the bit split unit and also coupled with the multiple-input multiple-output transmitter processing unit.

26. The apparatus of claim 17, wherein the powerline communication receiver comprises:
a first amplifier coupled with a line-neutral receiver port and also coupled with a first filter;
a second amplifier coupled with a line-ground receiver port and also coupled with a second filter;
a first analog-to-digital converter coupled with the first filter and also coupled with the shared FFT engine;
a second analog-to-digital converter coupled with the second filter and also coupled with the shared FFT engine;
a multiple-input multiple-output receiver processing unit coupled with the shared FFT engine;
a first de-mapper coupled with the multiple-input multiple-output receiver processing unit and also coupled with a bit combine unit;
a second de-mapper coupled with the multiple-input multiple-output receiver processing unit and also coupled with the bit combine unit; and
a de-interleave unit coupled with the bit combine unit and also coupled with a forward error correction decode unit.

27. The apparatus of claim 26, wherein the first analog-to-digital converter and the second analog-to-digital converter are included in a shared analog-to-digital converter.

28. The apparatus of claim 26, wherein the powerline communication receiver further comprises a mode selection unit coupled with the bit combine unit and also coupled with the multiple-input multiple-output receiver processing unit.

29. A method comprising:
determining, at a first powerline communication device, whether an operational mode associated with a second powerline communication device is a multiple-input multiple-output (MIMO) mode or a single-input single-output (SISO) mode;
determining whether the operational mode of the second powerline communication device matches an operational mode of the first powerline communication device; and
dynamically changing the operational mode of the first powerline communication device to either the MIMO mode or the SISO mode to match the operational mode of the second powerline communication device in response to determining the operational mode of the second powerline communication device does not match the operational mode of the first powerline communication device.

30. The method of claim 29, further comprising:
in response to determining to dynamically change the operational mode from the SISO mode to the MIMO mode, dynamically enabling both a first transmit chain associated with a first powerline communication channel and a second transmit chain associated with a second powerline communication channel; and
in response to determining to dynamically change the operational mode from the MIMO mode to the SISO mode, dynamically enabling the first transmit chain associated with the first powerline communication channel and disabling the second transmit chain associated with the second powerline communication channel.

31. A method comprising:
receiving a communication at a first powerline communication device from a second powerline communication device;
determine whether an operational mode associated with the second powerline communication device is a multiple-input multiple-output (MIMO) mode or a single-input single-output (SISO) mode;
determine whether the operational mode of the second powerline communication device matches an operational mode of the first powerline communication device; and
dynamically changing the operational mode of the first powerline communication device to either the MIMO mode or the SISO mode to match the operational mode of the second powerline communication device in response to determining the operational mode of the second powerline communication device does not match the operational mode of the first powerline communication device.

32. The method of claim 31, further comprising:
- in response to determining to dynamically change the operational mode from the SISO mode to the MIMO mode, dynamically enabling both a first receive chain associated with a first powerline communication channel and a second receive chain associated with a second powerline communication channel; and
- in response to determining to dynamically change the operational mode from the MIMO mode to the SISO mode, dynamically enabling the first receive chain associated with the first powerline communication channel and disabling the second receive chain associated with the second powerline communication channel.

* * * * *